(12) United States Patent
Lehocky et al.

(10) Patent No.: US 11,949,845 B2
(45) Date of Patent: Apr. 2, 2024

(54) DYNAMIC VISUAL OVERLAY FOR ENHANCED TERRAIN PERCEPTION ON REMOTE CONTROL CONSTRUCTION EQUIPMENT

(71) Applicant: Caterpillar Inc., Peoria, IL (US)

(72) Inventors: Craig Allan Lehocky, Pittsburgh, PA (US); Michael William Bridenbaugh, Sewickley, PA (US); Brad Robert Van de Veer, Washington, IL (US); Jeffrey K. Berry, Yorkville, IL (US); Jeffrey J. Baker, Pittsburgh, PA (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/900,586

(22) Filed: Aug. 31, 2022

(65) Prior Publication Data

US 2024/0073393 A1 Feb. 29, 2024

(51) Int. Cl.
| | | |
|---|---|---|
| *H04N 13/156* | (2018.01) | |
| *H04N 13/128* | (2018.01) | |
| *H04N 13/15* | (2018.01) | |

(52) U.S. Cl.
CPC ......... *H04N 13/156* (2018.05); *H04N 13/128* (2018.05); *H04N 13/15* (2018.05)

(58) Field of Classification Search
CPC ........ G06V 20/10; G06V 20/20; G06V 20/56; G06V 20/182; G06V 20/188; G06V 20/194; G06V 20/176; B60K 35/00; B60K 2370/177; B60R 1/22; B60R 1/20; B60R 1/23; B60R 1/27; B60R 1/28; B60R 1/31; A61B 2090/365; G06T 19/006; H04N 13/156; H04N 13/128; H04N 13/15
USPC .......................................................... 348/43
See application file for complete search history.

(56) References Cited

U.S. PATENT DOCUMENTS

| | | |
|---|---|---|
| 9,335,545 B2 | 5/2016 | Johnson et al. |
| 9,824,490 B1 | 11/2017 | Côté et al. |
| 10,550,549 B2 | 2/2020 | France et al. |
| 10,882,468 B1 | 1/2021 | Czarnecki et al. |
| 10,997,889 B2 | 5/2021 | Onishi et al. |
| 11,216,664 B2 | 1/2022 | Havnør et al. |
| 2019/0055715 A1* | 2/2019 | Wei .................. E02F 9/205 |
| 2019/0129430 A1* | 5/2019 | Madsen ............ G05D 1/0246 |
| 2019/0249398 A1* | 8/2019 | France .................. B60R 1/00 |
| 2020/0175272 A1* | 6/2020 | Havnør ............... G06V 20/58 |
| 2021/0246636 A1 | 8/2021 | Mathew et al. |

* cited by examiner

*Primary Examiner* — Christopher S Kelley
*Assistant Examiner* — Ana Picon-Feliciano
(74) *Attorney, Agent, or Firm* — Procopio, Cory, Hargreaves & Savitch LLP

(57) ABSTRACT

During operation of a machine, an understanding of terrain features is critical. Accordingly, disclosed embodiments augment a video stream, captured by a camera mounted on the machine, with terrain information. In particular, an overlay is generated on at least one image frame. The overlay, which may comprise one or more semi-transparent bands, may cyclically recede from a foreground to a background of the image frame(s), cyclically advance from a background to a foreground of the image frame(s), or cyclically move horizontally across the image frame(s). The overlay may be colorized to illustrate the height of the terrain underneath the overlay.

18 Claims, 14 Drawing Sheets

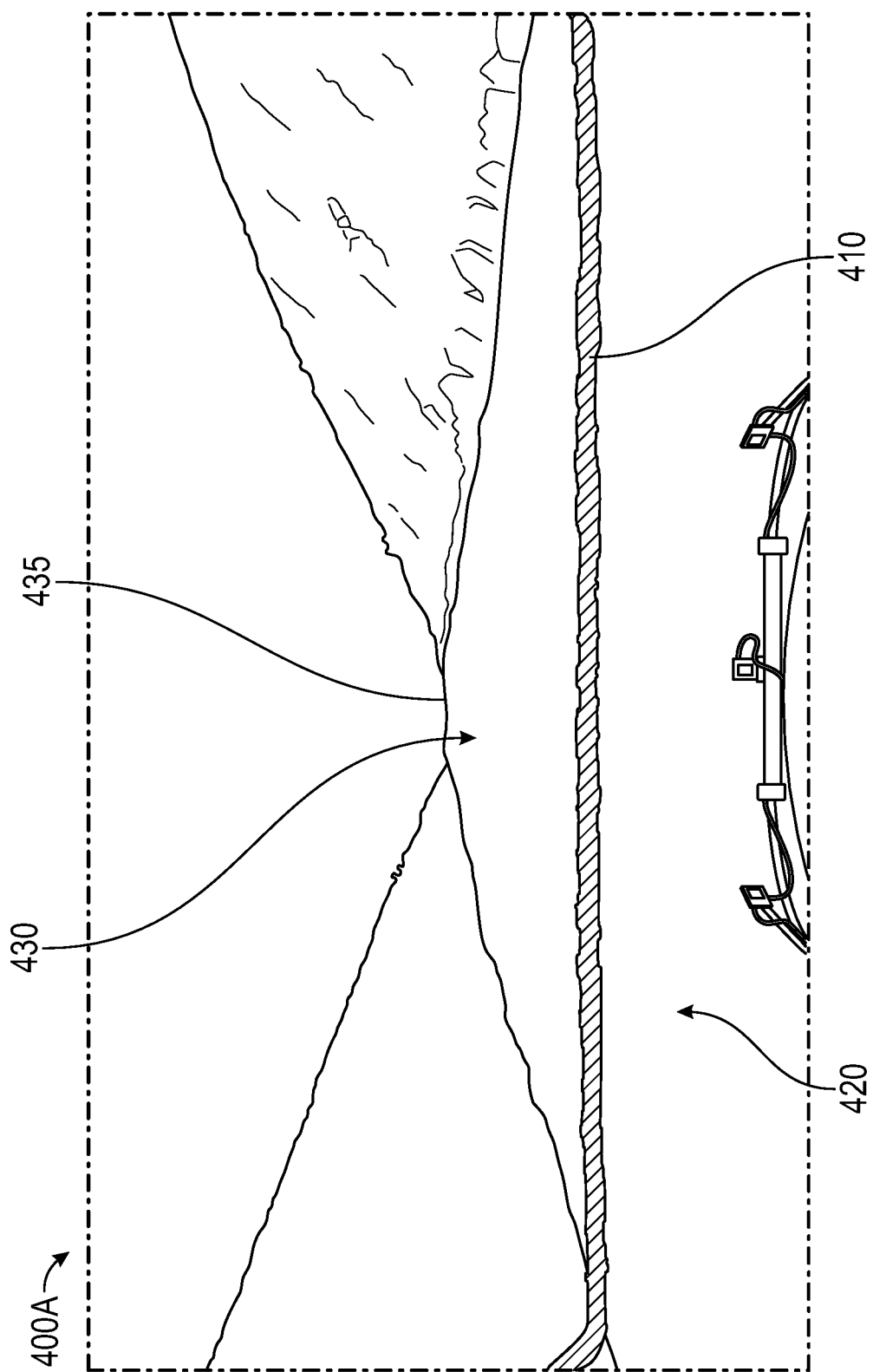

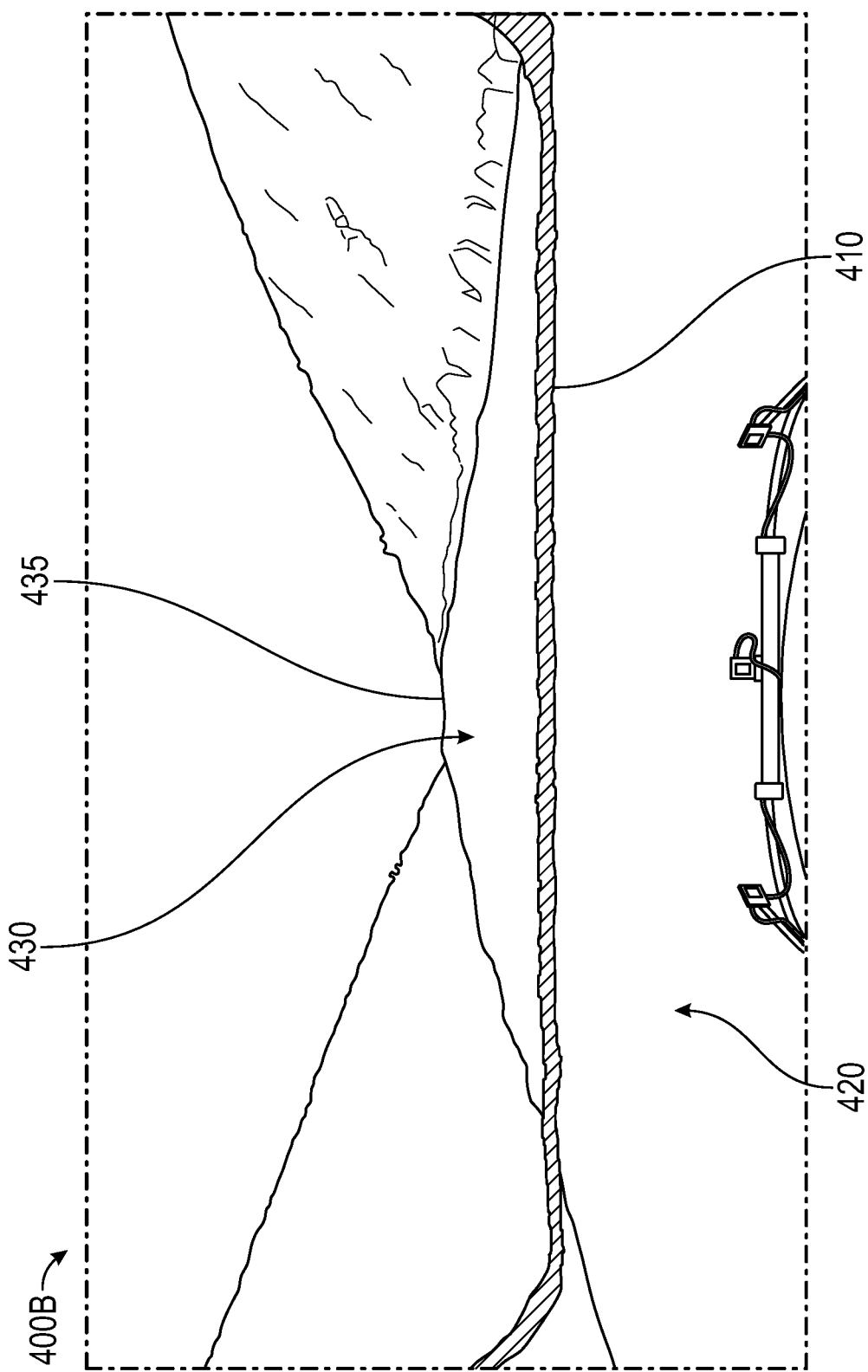

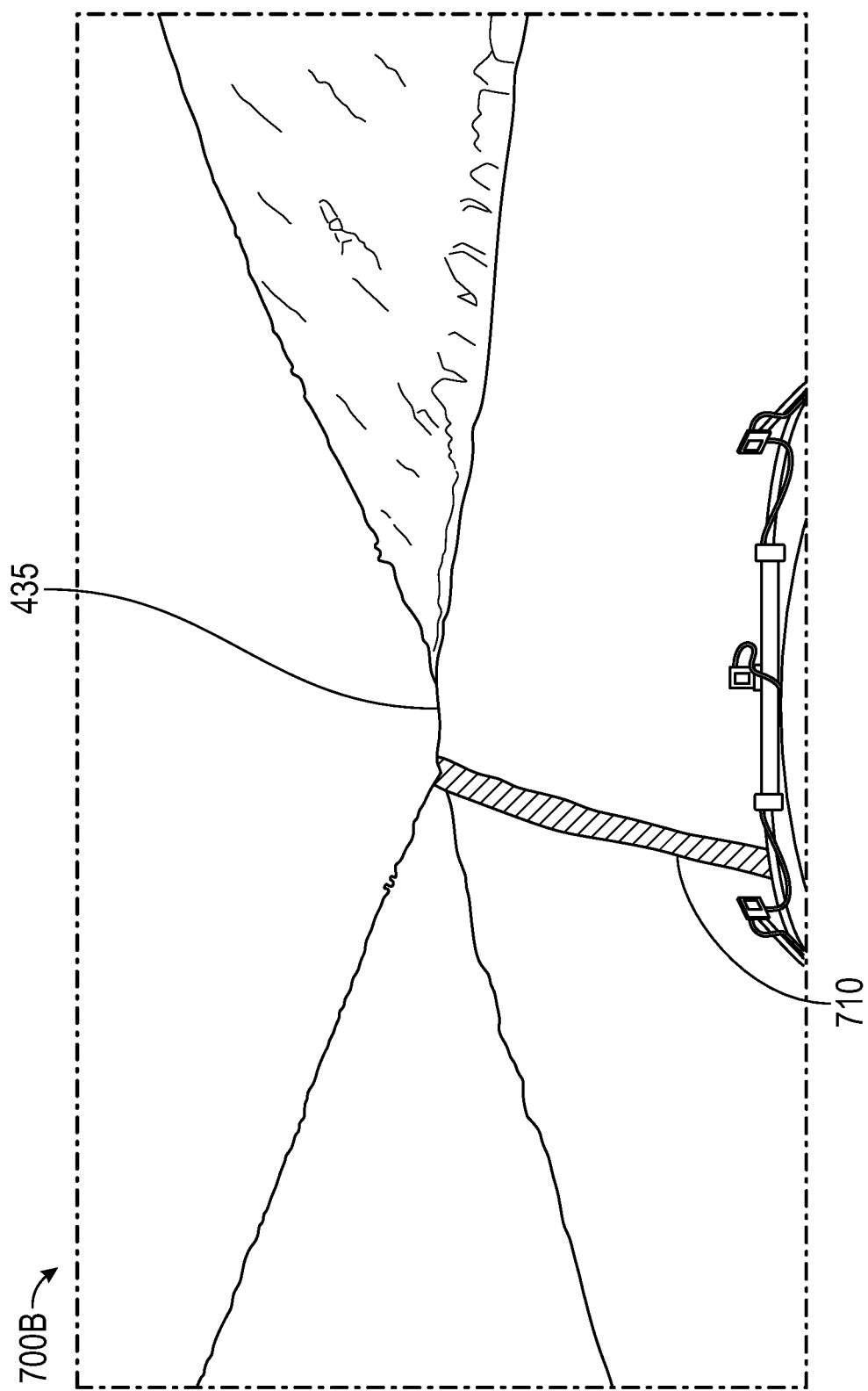

DYNAMIC VISUAL OVERLAY FOR ENHANCED TERRAIN PERCEPTION ON REMOTE CONTROL CONSTRUCTION EQUIPMENT

TECHNICAL FIELD

The embodiments described herein are generally directed to remote operations of machines, such as construction equipment, and, more particularly, to a dynamic visual overlay for enhancing terrain perception in real-time video for remote control of a machine.

BACKGROUND

Mobile machines, such as construction vehicles, may comprise one or more cameras that are positioned and mounted to capture video of one or more areas around the machine. When operating the machine from within the vehicle cabin, the operator can use the video from these cameras to view hard-to-see areas, such as those to the rear and/or sides of the machine. When operating the machine remotely from a remote terminal, these cameras may serve the same purpose but should also include a forward-facing camera so that the remote operator can view the area in front of the machine.

During remote operation, an understanding of terrain features is critical for the operator to plan and act efficiently for a given task. Terrain information may be inferred from video captured by one or more cameras mounted on the machine. However, the two-dimensional image frames, forming such video, lack information regarding the depth of terrain features. In addition, some terrain features may be obscured due to image compression and/or lens distortion. While a remote operator may be able to deduce terrain features by maneuvering the machine to change the perspective of the camera(s), it may not be possible to glean such features when the machine is stationary.

To aid in operations, various means exist for augmenting the video captured by machines. For example, U.S. Pat. No. 10,550,549 describes a means for augmenting a reality display for an excavator with an overlay image of a virtual trench having a three-dimensional model of underground features. As another example, U.S. Pat. No. 11,216,664 describes a method and device for augmenting a person's view of a mining vehicle with a visualization of a risk zone.

The present disclosure is directed toward overcoming one or more of the problems discovered by the inventors.

SUMMARY

In an embodiment, a method of augmenting image data during operation of machine comprises using at least one hardware processor to: for each of one or more image frames in input image data captured by a camera mounted on the machine, acquire three-dimensional (3D) data for the image frame based on an output of a 3D sensor mounted on the machine; project the 3D data onto a coordinate system of the image frame; determine a position of an overlay within the image frame; generate the overlay at the determined position within the image frame to produce an augmented image frame; and output the augmented image frame to output image data, wherein the position of the overlay within the augmented one or more image frames is moved along a dimension of the output image data in each of a plurality of cycles.

In an embodiment, a machine comprises: a camera configured to capture a field of view in front of the machine; a three-dimensional (3D) sensor; at least one hardware processor; and software configured to, when executed by the at least one hardware processor, for each of one or more image frames in input image data captured by the camera, acquire 3D data for the image frame based on an output of the 3D sensor, project the 3D data onto a coordinate system of the image frame, determine a position of an overlay within the image frame, generate the overlay at the determined position within the image frame to produce an augmented image frame, and output the augmented image frame to output image data, wherein the position of the overlay within the augmented one or more image frames is moved along a dimension of the output image data in each of a plurality of cycles.

In an embodiment, a non-transitory computer-readable medium has instructions stored thereon, wherein the instructions, when executed by a processor, cause the processor to: for each of one or more image frames in input image data captured by a camera mounted on the machine, acquire three-dimensional (3D) data for the image frame based on an output of a 3D sensor mounted on the machine; project the 3D data onto a coordinate system of the image frame; determine a position of an overlay within the image frame; generate the overlay at the determined position within the image frame to produce an augmented image frame; and output the augmented image frame to output image data, wherein the position of the overlay within the augmented one or more image frames is moved along a dimension of the output image data in each of a plurality of cycles.

BRIEF DESCRIPTION OF THE DRAWINGS

The details of embodiments of the present disclosure, both as to their structure and operation, may be gleaned in part by study of the accompanying drawings, in which like reference numerals refer to like parts, and in which:

FIGS. 4A-4C illustrate an example of an overlay in augmented image data, according to an embodiment;

FIGS. 7A-7C illustrate an example of an overlay in augmented image data, according to an embodiment.

DETAILED DESCRIPTION

The detailed description set forth below, in connection with the accompanying drawings, is intended as a description of various embodiments, and is not intended to represent the only embodiments in which the disclosure may be practiced. The detailed description includes specific details for the purpose of providing a thorough understanding of the embodiments. However, it will be apparent to those skilled in the art that embodiments of the invention can be practiced without these specific details. In some instances, well-known structures and components are shown in simplified form for brevity of description.

Figure 1:
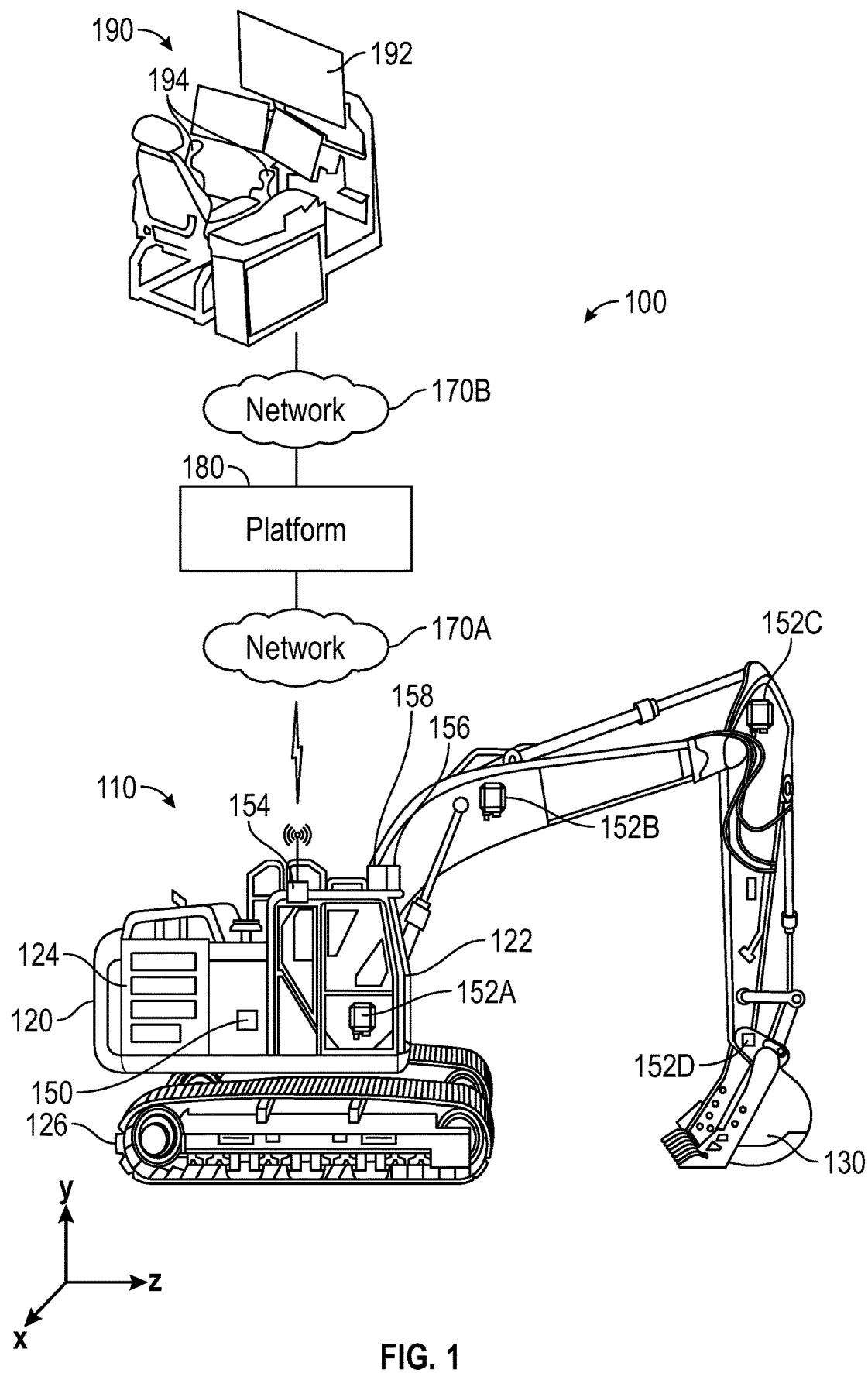
FIG. 1 illustrates remote operation of a machine in a machine environment, according to an embodiment.

FIG. 1 illustrates remote operation of a machine 110 in a machine environment 100, according to an embodiment. Machine environment 100 may include an environment in which one or more machines 110 perform a task associated within an industry, such as mining, construction, transportation, energy exploration, farming, or the like. For example, machine environment 100 could include one or more mine sites in which a plurality of machines 110 cooperate to perform a task associated with mining. However, it should be understood that disclosed embodiments are not limited to any particular environment. In addition, while machine 110 is illustrated as an excavator, it should be understood that machine 110 may be any type of mobile equipment, including a wheel loader, dump truck, asphalt paver, backhoe loader, skid steer, track loader, cold planer, compactor, dozer, electric rope shovel, forest machine, hydraulic mining shovel, material handler, motor grader, pipe-layer, road reclaimer, telehandler, tractor-scraper, or the like, as well as ordinary road vehicles (e.g., automobiles, semi-trucks, etc.), aircraft, or maritime vessels (e.g., boats, ships, barges, etc.). While machine 110 could also be non-mobile equipment, the disclosed embodiments primarily benefit equipment that is remotely operated to move throughout machine environment 100.

In the illustrated example, machine 110 comprises a machine body 120 and a work implement 130. Machine body 120 may comprise a cabin 122, an engine 124, and ground-engaging members 126. Cabin 122 may comprise a seat for an operator, as well as controls (e.g., integrated joystick(s)), a console (e.g., an integrated display with inputs), and/or the like. Ground-engaging members 126 are illustrated as tracks, but may comprise other types of components for moving machine body 120 with respect to the ground, such as wheels, rollers, and/or the like. Ground-engaging members 126 may be driven by a drivetrain, which is in turn driven by engine 124. Work implement 130 is illustrated as an arm and bucket, but may comprise any other type of tool.

Machine 110 may comprise an electronic control unit (ECU) 150 that is communicatively coupled (e.g., via wired or wireless communications) to one or a plurality of sensors 152A-D (which may be collectively referred to herein as sensor(s) 152) and/or subsystems of machine 110. ECU 150 may collect data from sensor(s) 152 and/or subsystems of machine 110 and process the collected data. Processing the collected data may comprise determining one or more machine states from the collected data, generating an alert based on the collected data (e.g., if a value of a parameter in the data satisfies a predefined threshold), filtering, analyzing, sorting, correlating, storing, and/or relaying the collected data, and/or the like. ECU 150 may also control the operation of one or more subsystems of machine 110 based on the collected data and/or operator commands. For example, ECU 150 may be communicatively coupled to a fuel injection system associated with engine 124 of machine 110. ECU 150 may receive an operator command (e.g., increase throttle) and provide command signals to the fuel injection system of engine 124, which may responsively increase the flow of fuel from a fuel supply to engine 124. Engine 124 may be connected to a torque converter that transmits power from engine 124 to a transmission of the drivetrain that drives ground engaging members 126, to thereby move machine 110 with respect to the ground.

Sensor(s) 152 may include any type of sensor or sensor array capable of measuring values of one or more parameters of one or more subsystems of machine 110 and/or machine environment 100. Examples of such parameters include, without limitation, position(s) of work implement 130, engine speed, machine speed, location of machine 110 (e.g., coordinates acquired via a global navigation satellite system (GNSS), such as the Global Positioning System (GPS)), pressure of a fluid (e.g., fuel, oil, coolant, etc.), flow rate of a fluid, temperature of a fluid, contamination level of a fluid, viscosity of a fluid, electric current, electric voltage, fluid consumption rates, loading level, transmission output ratio, slip, grade, traction, mileage, time or mileage until or since scheduled maintenance, and/or the like.

Machine 110 may comprise a communication module 154, which may be separate or integral to ECU 150. Communication module 154 may comprise hardware and/or software that enables communication between communication module 154 and an access point of a network 170A. For example, communication module 154 may comprise or be connected to a processor, network interface, and wireless transceiver with an antenna that enables wireless communication with a base station of a cellular network. Communication module 154 may send data to a platform 180 and/or receive data from platform 180 via network 170A. For example, ECU 150 may transmit any of the data that is collected (e.g., from sensor(s) 152) or derived from collected data to platform 180 via communication module 154, as well as receive data, such as control commands, from platform 180 via communication module 154.

Machine 110 may comprise one or more cameras 156. Camera(s) 156 may comprise monocular camera(s). Each camera 156 captures video of a field of view of an area around machine 110. For example, a forward-facing camera 156 may capture a front field of view of an area in front of machine 110, including a view of work implement 130, a right-side-facing camera 156 may capture a right field of view of an area to the right of machine 110, a left-side-facing camera 156 may capture a left field of view of an area to the left side of machine 110, and a rear-facing camera 156 may capture a rear field of view of an area in the rear of machine 110. One or more of cameras 156 may be very wide-angle cameras with a field of view of 120-degrees or greater (e.g., between 120-degrees and 180-degrees). Different cameras 156 may have the same sized or differently sized fields of view. In an embodiment, each camera 156 has a maximum field of view that can be narrowed by mechanical, electronic, and/or software means, including in the captured video by software-based correction to eliminate fisheye distortion (e.g., using rectilinear projection). Thus, the field of view that appears in the final video (i.e., intended for viewing by an operator) from each camera 156 may represent the maximum field of view or some angle less (e.g., less than 120-degrees) than the maximum field of view.

Each camera 156 may stream or otherwise transmit the captured video, comprising a plurality of image frames, to platform 180 via communication module 154. Camera(s) 156 may transmit the video directly to communication module 154. Alternatively, camera(s) 156 may transmit the video to ECU 150, which may relay the video in real time (e.g., with or without pre-processing) to platform 180 through communication module 154. As used herein, the term "real time" or "real-time" encompasses events that occur simultaneously, as well as events that are temporally separated by ordinary delays resulting from processing latencies, network latencies, and/or the like.

Machine 110 may also comprise one or more three-dimensional (3D) sensors 158 configured to acquire 3D data about the terrain within at least the field of view of one of camera(s) 156. In the primary embodiment described herein, 3D sensor(s) 158 comprise a stereo camera, configured to acquire 3D data within a field of view of a forward-facing camera 156. A stereo camera comprises two or more lenses, separated by a distance (e.g., corresponding to a human intra-ocular distance), with a separate image sensor for each lens. A stereo camera simulates human binocular vision to capture stereographic images (i.e., images whose perspectives are shifted with respect to each other by the distance between the lenses of the stereo camera). Alternatively or additionally, 3D sensor(s) 158 may comprise a radio detection and ranging (RADAR) system, a light detection and ranging (LIDAR) system, a time-of-flight camera, an interferometer, and/or the like.

Cabin 122 may comprise a display console (not shown). The display console may comprise a plasma display, light-emitting diode (LED) display, liquid crystal display (LCD), and/or the like. In an embodiment, the display console may comprise an integrated touch sensor to form a touch panel display which may both display data and receive touch inputs at positions on the display from a local operator within cabin 122. Alternatively or additionally, the display console may receive inputs via other input means, such as keyboards, in-cabin cameras, biometric sensing devices, computer mice, trackballs, pen-based pointing devices, and/or the like. The display console may be communicatively coupled to ECU 150, communication module 154, and/or camera(s) 156. Thus, the display console may display a graphical user interface which enables a local operator in cabin 122 to view data collected by ECU 150 (e.g., real-time values of parameters of one or more subsystems of machine 110), data derived from data collected by ECU 150 (e.g., machine states, alerts, graphs, charts, tables, etc.), and/or data received from platform 180 via communication module 154, view video captured by camera(s) 156, interact with one or more software applications executed on-board machine 110 (e.g., within ECU 150), perform an audio or audiovisual communication with another person, and/or the like. Thus, an operator in cabin 122 may utilize the display console to view the surroundings of machine 110 via camera(s) 156, access operator assistance tools, receive alerts, dispatch information, operational instructions, and/or recommendations, review environmental data (e.g., weather, temperature, soil conditions, etc.), payload information, productivity data, and/or any other type of information, control one or more subsystems of machine 110 via commands to ECU 150, initiate or receive an audio or audiovisual call, and/or the like.

In an embodiment, video captured by camera(s) 156 is relayed (e.g., with or without pre-processing) to an external system, and, in the illustrated embodiment, through platform 180 to a remote terminal 190. Platform 180 may host and/or execute one or more of the various functions, processes, methods, and/or software modules described herein. Platform 180 may comprise dedicated servers or may instead be implemented in a computing cloud, in which the resources of one or more servers are dynamically and elastically allocated to multiple tenants based on demand. These servers may be collocated (e.g., in a single data center) and/or geographically distributed (e.g., across multiple data centers). Platform 180 may be communicatively connected to machine 110 via network 170A and/or a remote terminal 190 via network 170B. Networks 170A and 170B (which may be collectively referred to herein as network 170) may be the same network, separate and distinct networks, or overlapping networks, and may include one or more cellular networks, one or more satellite networks, the Internet, one or more intranets, and/or the like. While only a single instance of machine 110 and a single instance of remote terminal 190 are illustrated, it should be understood that platform 180 may be communicatively coupled to any number of machines 110 and remote terminals 190.

Platform 180 may comprise one or more web servers which host one or more websites and/or web services. In embodiments in which a website is provided, the website may comprise a graphical user interface, including, for example, one or more screens (e.g., webpages) generated in HyperText Markup Language (HTML) or other language. Platform 180 transmits or serves one or more screens of the graphical user interface in response to requests from machine 110 via network 170A and/or remote terminal 190 via network 170B. These screens may comprise a combination of content and elements, such as text, images, videos, animations, references (e.g., hyperlinks), frames, inputs (e.g., textboxes, text areas, checkboxes, radio buttons, drop-down menus, buttons, forms, etc.), scripts (e.g., JavaScript), and/or the like.

In embodiments in which a web service is provided, platform 180 may receive requests from external systems, and provide responses in eXtensible Markup Language (XML), JavaScript Object Notation (JSON), and/or any other suitable or desired format. In such embodiments, platform 180 may provide an application programming interface (API) (e.g., implemented with a Representation State Transfer (REST) architecture) which defines the manner in which machine 110, remote terminal 190, and/or other external system(s) may interact with the web service. Thus, machine 110, remote terminal 190, and/or other external systems (which may themselves be servers), can define their own user interfaces, and rely on the web service to implement or otherwise provide the backend processes, methods, functionality, storage, and/or the like, described herein. For example, in such an embodiment, a client application, executing on remote terminal 190, may interact with platform 180 to execute one or more or a portion of one or more of the various functions, processes, methods, and/or software modules described herein. In this case, the client application may generate the graphical user interface and access functionality on platform 180 via the API.

Remote terminal 190 may comprise any type of computing device capable of wired and/or wireless communication, including without limitation, desktop computers, laptop computers, tablet computers, smart phones or other mobile phones, servers, game consoles, televisions, set-top boxes, electronic kiosks, point-of-sale terminals, and/or the like. However, it is generally contemplated that remote terminal 190 is a remote operating station by which a remote operator can operate machine 110 through platform 180. In an alternative embodiment, remote terminal 190 may communicate directly with machine 110 (i.e., without platform 180 acting as intermediary) to operate machine 110. In either case, remote terminal 190 may comprise one or more displays 192 that display, in real time, video captured by camera(s) 156 and transmitted by communication module 154 of machine 110. Remote terminal 190 may also comprise one or more input devices 194 (e.g., joysticks) that enable an operator to provide operating controls to machine 110. These operating controls may be transmitted as control commands, directly or via platform 180, to communication module 154, which may relay the control commands to ECU 150. ECU 150 may responsively control the appropriate subsystem of machine 110 in accordance with the control commands. In general, for safety reasons, each remote terminal 190 should control one machine 110 at a time. However, this is not a requirement of any embodiment. As illustrated, display(s) 192 and input(s) 194 may be configured to simulate cabin 122 within machine 110.

Figure 2:
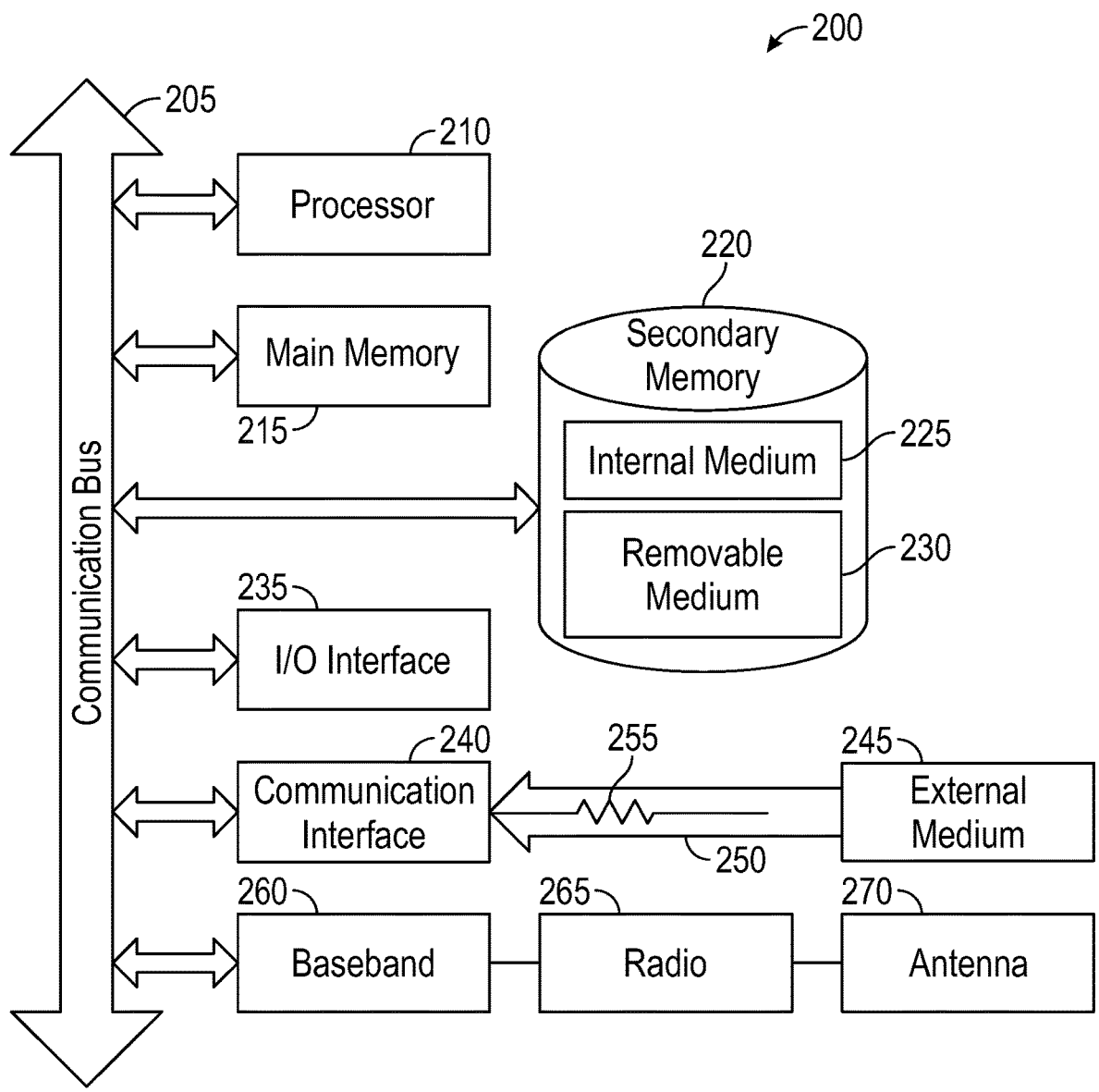
FIG. 2 illustrates an example processing system, by which one or more of the processes described herein, may be executed, according to an embodiment.

FIG. 2 is a block diagram illustrating an example wired or wireless system 200 that may be used in connection with various embodiments described herein. For example, system 200 may be used as or in conjunction with one or more of the functions, processes, or methods described herein (e.g., to store and/or execute the implementing software), and may represent components of machine 110 (e.g., ECU 150, communication module 154, camera(s) 156, the display console in cabin 122, etc.), platform 180, remote terminal 190, and/or other processing devices described herein. System 200 can be a server or any conventional personal computer, or any other processor-enabled device that is capable of wired or wireless data communication. Other computer systems and/or architectures may be also used, as will be clear to those skilled in the art.

System 200 preferably includes one or more processors 210. Processor(s) 210 may comprise a central processing unit (CPU). Additional processors may be provided, such as a graphics processing unit (GPU), an auxiliary processor to manage input/output, an auxiliary processor to perform floating-point mathematical operations, a special-purpose microprocessor having an architecture suitable for fast execution of signal-processing algorithms (e.g., digital-signal processor), a processor subordinate to the main processing system (e.g., back-end processor), an additional microprocessor or controller for dual or multiple processor systems, and/or a coprocessor. Such auxiliary processors may be discrete processors or may be integrated with processor 210. Examples of processors which may be used with system 200 include, without limitation, any of the processors (e.g., Pentium™, Core i7™, Xeon™, etc.) available from Intel Corporation of Santa Clara, California, any of the processors available from Advanced Micro Devices, Incorporated (AMD) of Santa Clara, California, any of the processors (e.g., A series, M series, etc.) available from Apple Inc. of Cupertino, any of the processors (e.g., Exynos™) available from Samsung Electronics Co., Ltd., of Seoul, South Korea, any of the processors available from NXP Semiconductors N.V. of Eindhoven, Netherlands, and/or the like.

Processor 210 is preferably connected to a communication bus 205. Communication bus 205 may include a data channel for facilitating information transfer between storage and other peripheral components of system 200. Furthermore, communication bus 205 may provide a set of signals used for communication with processor 210, including a data bus, address bus, and/or control bus (not shown). Communication bus 205 may comprise any standard or non-standard bus architecture such as, for example, bus architectures compliant with industry standard architecture (ISA), extended industry standard architecture (EISA), Micro Channel Architecture (MCA), peripheral component interconnect (PCI) local bus, standards promulgated by the Institute of Electrical and Electronics Engineers (IEEE), and/or the like.

System 200 preferably includes a main memory 215 and may also include a secondary memory 220. Main memory 215 provides storage of instructions and data for programs executing on processor 210, such as any of the software discussed herein. It should be understood that programs stored in the memory and executed by processor 210 may be written and/or compiled according to any suitable language, including without limitation C/C++, Java, JavaScript, Perl, Visual Basic, .NET, and the like. Main memory 215 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), ferroelectric random access memory (FRAM), and the like, including read only memory (ROM).

Secondary memory 220 is a non-transitory computer-readable medium having computer-executable code (e.g., any of the software disclosed herein) and/or other data stored thereon. The computer software or data stored on secondary memory 220 is read into main memory 215 for execution by processor 210. Secondary memory 220 may include, for example, semiconductor-based memory, such as programmable read-only memory (PROM), erasable programmable read-only memory (EPROM), electrically erasable read-only memory (EEPROM), flash memory (block-oriented memory similar to EEPROM), and the like.

Secondary memory 220 may optionally include an internal medium 225 and/or a removable medium 230. Removable medium 230 is read from and/or written to in any well-known manner. Removable storage medium 230 may be, for example, a magnetic tape drive, a compact disc (CD) drive, a digital versatile disc (DVD) drive, other optical drive, a flash memory drive, and the like.

In an embodiment, I/O interface 235 provides an interface between one or more components of system 200 and one or more input and/or output devices. Example input devices include, without limitation, sensors, keyboards, touch screens or other touch-sensitive devices, cameras, biometric sensing devices, computer mice, trackballs, pen-based pointing devices, and/or the like. Examples of output devices include, without limitation, other processing devices, cathode ray tubes (CRTs), plasma displays, light-emitting diode (LED) displays, liquid crystal displays (LCDs), printers, vacuum fluorescent displays (VFDs), surface-conduction electron-emitter displays (SEDs), field emission displays (FEDs), and/or the like. In some cases, an input and output device may be combined, such as in the case of a touch panel display (e.g., display console 158, or in a smartphone, tablet computer, or other mobile device).

System 200 may include a communication interface 240. Communication interface 240 allows software and data to be transferred between system 200 and external devices (e.g. printers), networks (e.g., network(s) 170), or other information sources. For example, computer software or executable code may be transferred to system 200 from a network server (e.g., platform 180) via communication interface 240. Examples of communication interface 240 include a built-in network adapter, network interface card (NIC), Personal Computer Memory Card International Association (PCMCIA) network card, card bus network adapter, wireless network adapter, Universal Serial Bus (USB) network adapter, modem, a wireless data card, a communications port, an infrared interface, an IEEE 1394 fire-wire, and any other device capable of interfacing system 200 with a network (e.g., network(s) 170) or another computing device. Communication interface 240 preferably implements industry-promulgated protocol standards, such as Ethernet IEEE 802 standards, Fiber Channel, digital subscriber line (DSL), asynchronous digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on, but may also implement customized or non-standard interface protocols as well.

Software and data transferred via communication interface 240 are generally in the form of electrical communication signals 255. These signals 255 may be provided to communication interface 240 via a communication channel 250. In an embodiment, communication channel 250 may be a wired or wireless network (e.g., network(s) 170), or any variety of other communication links. Communication channel 250 carries signals 255 and can be implemented using a variety of wired or wireless communication means including wire or cable, fiber optics, conventional phone line, cellular phone link, wireless data communication link, radio frequency ("RF") link, or infrared link, just to name a few.

Computer-executable code (e.g., computer programs, such as the disclosed software) is stored in main memory 215 and/or secondary memory 220. Computer-executable code can also be received via communication interface 240 and stored in main memory 215 and/or secondary memory 220. Such computer programs, when executed, enable system 200 to perform the various functions of the disclosed embodiments described elsewhere herein.

In this description, the term "computer-readable medium" is used to refer to any non-transitory computer-readable storage media used to provide computer-executable code and/or other data to or within system 200. Examples of such media include main memory 215, secondary memory 220 (including internal memory 225 and/or removable medium 230), external storage medium 245, and any peripheral device communicatively coupled with communication interface 240 (including a network information server or other network device). These non-transitory computer-readable media are means for providing software and/or other data to system 200.

System 200 may also include optional wireless communication components that facilitate wireless communication over a voice network and/or a data network. The wireless communication components (e.g., corresponding to communication module 154) comprise an antenna system 270, a radio system 265, and a baseband system 260. Baseband system 260 is communicatively coupled with processor(s) 210. In system 200, radio frequency (RF) signals are transmitted and received over the air by antenna system 270 under the management of radio system 265.

Figure 3A:
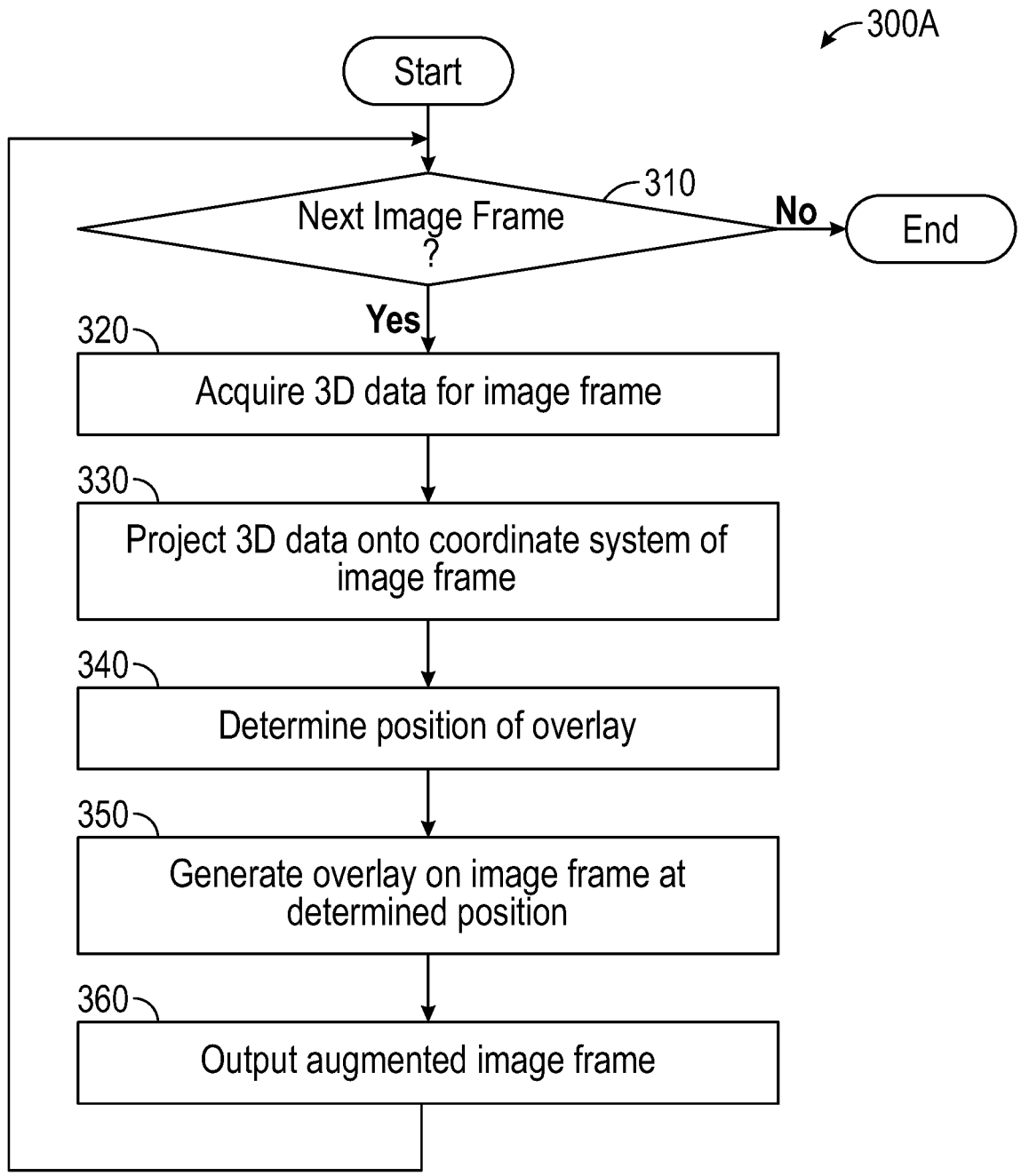
FIGS. 3A and 3B illustrate a process for enhancing terrain perception using a dynamic visual overlay, according to alternative embodiments.

FIG. 3A illustrates a process 300A for enhancing terrain perception using a dynamic visual overlay, according to an embodiment. While process 300A is illustrated with a certain arrangement and ordering of subprocesses, process 300A may be implemented with fewer, more, or different subprocesses and a different arrangement and/or ordering of subprocesses. It should be understood that any subprocess, which does not depend on the completion of another subprocess, may be executed before, after, or in parallel with that other independent subprocess, even if the subprocesses are described or illustrated in a particular order.

It is contemplated that process 300A is executed on machine 110. In particular, process 300A may be executed by ECU 150 or another processing device on machine 110. While process 300A could be executed remotely on an external system, such as platform 180 or remote terminal 190, the additional data required (e.g., two stereoscopic image frames, instead of a single augmented image frame, for each image frame) may increase traffic on network 170 and introduce delays, caused by network latencies, into process 300A. In an alternative embodiment, a portion of process 300A could be executed on machine 110, while another portion of process 300A is executed on an external system. However, it should be understood that process 300A is a relatively computationally inexpensive process that should be capable of being entirely executed on machine 110.

Process 300A may be initiated as soon as machine 110 is started, as soon as operation begins, in response to an input by the operator, in response to machine 110 becoming stationary or near stationary (e.g., the speed of machine 110 becoming less than a predetermined threshold), or in response to any other triggering event. In general, process 300A will execute to iteratively augment image frames in image data (e.g., an input video stream) being captured by camera 156. The augmented image data (e.g., as an output video stream) may be transmitted via communication module 154 to remote platform 180 and/or remote terminal 190. Alternatively or additionally, the augmented image data may be displayed on a display console within cabin 122 of machine 110. It should be understood that every image frame of the image data may be augmented or the image frames may be augmented at a predefined frame rate (e.g., an image frame is augmented at intervals of a predefined number of image frames).

In subprocess 310, it is determined whether or not at least one image frame remains to be augmented. If at least one image frame remains to be augmented (i.e., "Yes" in subprocess 310), process 300A executes an iteration of subprocesses 320-360 to augment the next image frame. Otherwise, if no image frames remain to be augmented (i.e., "No" in subprocess 310), process 300A may end. It may be determined that an image frame remains to be augmented for as long as image data is being captured by camera(s) 156. Generally, process 300A may execute for as long as image data is being captured by camera(s) 156, until machine 110 is turned off, until remote operation ends, in response to an input by a remote or local operator (e.g., ending augmentation), in response to machine 110 moving or the speed of machine 110 exceeding a predetermined threshold, or in response to any other triggering event.

In an embodiment, augmentation of the image data may be a setting that can be turned on and off by the operator. For example, the operator may select an input (e.g., a toggle input in a settings menu of remote terminal 190) to start process 300, and select an input (e.g., the same toggle input) to end process 300. Thus, the operator may utilize the augmentation when desired, and turn off the augmentation when augmentation is not desired.

In subprocess 320, 3D data is acquired for the current image frame to be augmented. In particular, the 3D data may be received from 3D sensor(s) 158 or derived from data output by 3D sensor(s) 158. It should be understood that the 3D data that is acquired for the current image frame represents a view of the world that was visible to 3D sensor(s) 158 at the same time that the current image frame was captured by camera 156. In other words, the 3D data, produced by 3D sensor(s) 158, are correlated in time with the image frames captured by camera 156, such that each image frame can be easily associated with corresponding 3D data. Any technique for correlating data may be used to correlate the 3D data with image frames, including, without limitation, time-stamping the 3D data and image frames as they are received, processing the 3D data and image frames in parallel as they are received, and/or the like.

In an embodiment, 3D sensor(s) 158 comprise a stereo camera, configured to capture a stereoscopic image that includes the same field of view as a forward-facing camera 156 used to capture real-time video for a remote operator at remote terminal 190. It should be understood that the stereo camera does not have to be a dedicated stereo camera, but rather, could, in the alternative, be the combination of two regular monocular cameras (e.g., two cameras 156) that have overlapping fields of view and whose geometric relationship to each other is known (e.g., stored in memory). In this case, the camera 156 whose image data is augmented could also act as one of the camera in the stereo camera of 3D sensor 158. Both the stereo camera and the forward-facing camera 156 may be oriented with their focal axes at the same pitch towards the ground. It should be understood that the pitch is an angle of the focal axis with respect to a vertical axis of machine 110. A pitch of 0 degrees represents a focal axis that is straight down towards the ground (i.e., parallel with the vertical axis of machine 110 and generally perpendicular to the ground plane in contact with ground-engaging members 126), and a pitch of 90 degrees represents a focal axis that is straight ahead (i.e., perpendicular to the vertical axis of machine 110 and generally parallel to the ground plane in contact with ground-engaging members 126). The pitch may be anywhere between 0 degrees and 90 degrees, but will generally be between 35 and 80 degrees.

A stereo camera captures a stereoscopic image by using two cameras to capture two images of the same scene from two slightly shifted perspectives. The stereoscopic image can be used to estimate the depth of pixels by finding matching pixels in the two images and calculating the depth of the matched pixels based on the known geometric arrangement of the two cameras and the disparity (e.g., pixel difference) between matching pixels. For example, a disparity map may be generated by matching pixels or patches in one of the two images to corresponding pixels or patches in the other one of the two images (e.g., using any known matching technique), and then calculating the distance (i.e., disparity) between each pair of corresponding pixels or patches. It should be understood that larger disparities indicate an object is closer to the stereo camera and smaller disparities indicate an object is farther from the stereo camera. Based on the disparity map and the geometric arrangement of the stereo camera (e.g., distance between the two cameras along the X axis, pitch of the cameras relative to the Y axis, relationship of the cameras to a reference point of machine 110), the distance of each pixel in the image from a reference point of machine 110 (e.g., the front of cabin 122, the front of engaging members 126, etc.), along the Z axis, can be calculated using basic trigonometry, such as, for example:

$$\text{depth} = \text{lens distance} * \frac{\text{focal length}}{\text{disparity value}}$$

wherein depth is the distance between the pixel and the reference point along the Z axis, lens distance is the distance between the two lenses of the stereo camera, focal length is the focal length of the stereo camera, and disparity value is the disparity value in the disparity map for the pixel. In some instances, the depth of a pixel may be interpolated (e.g., if there is no corresponding pixel in the other image), for example, based on the calculated disparities and/or depths of neighboring pixels.

In an embodiment, the stereoscopic image, the disparity map, and/or the pixel depths may be filtered using known filtering techniques. For example, a spatial noise reduction filter may be applied to the stereoscopic image and/or disparity map to reduce noise (e.g., by removing outliers). Additionally or alternatively, a temporal filter may be applied to a stereoscopic image frame within the captured video and/or its corresponding disparity map to reduce noise based on subsequent stereoscopic image frames within the same captured video and/or their corresponding disparity maps. As another example, a filter may be applied to the disparity map and/or resulting pixel depths to smooth the values.

In addition to depth, the height of each pixel, relative to the ground plane of ground-engaging members 126 may be calculated, based on the depth value for the pixel and the known geometric arrangement of the stereo camera. In other words, 3D data is calculated for each pixel in the stereoscopic image. This 3D data may include, for each pixel, the depth of the pixel along the Z axis, and the height of the pixel, relative to the ground plane, along the Y axis, as well as the position of the pixel along the X axis (by virtue of its position in the stereoscopic image).

In an alternative embodiment, 3D sensor(s) 158 may comprise a LIDAR or similar ranging system. In this case, 3D sensor(s) 158 may output a point cloud, with each point represented by a set of 3D coordinates, representing the point's position along the X axis, Y axis, and Z axis. It should be understood that, while such a 3D sensor may output more accurate 3D data than can be calculated from the stereoscopic image of a stereo camera, it is generally significantly more expensive than a stereo camera.

In subprocess 330, the 3D data, acquired in subprocess 320, are projected onto the coordinate system of the image frame captured by camera 156. Regardless of the particular type of 3D sensor 158 that is utilized, the 3D data may comprise 3D coordinates for a plurality of points within the field of view of camera 156. Each of these points may be projected into the two-dimensional (2D) coordinate system of the image plane of camera 156, using known projection techniques. In other words, the depth and height of each point, as determined for a particular point in time, is mapped to a 2D coordinate within an image frame captured by camera 156 at that same point in time. In this manner, the pixels in each image frame, captured by camera 156, are associated with at least a depth and a height.

In subprocess 340, the position of the overlay to be generated in the current iteration is determined. The position may be represented in terms of depth, such that each position represents a range of depths to be indicated by the overlay. For example, the position may be represented as a starting depth value and ending depth value, a starting depth value and depth range, an ending depth value and depth range, or the like. The position of the overlay is moved (e.g., incremented or decremented by a predefined amount) along a dimension of the output image data in one or more iterations. In an embodiment, the position of the overlay is moved along the vertical dimension of the output image data. In a preferred embodiment, the position of the overlay is successively incremented along the vertical dimension in a plurality of cycles, such that the overlay appears in the output image data (e.g., video stream) to graually recede from the foreground in the output image data into the background and towards the horizon in the output image data. Once the position of the overlay reaches the position of the horizon (e.g., a point along the vertical dimension, above which no valid depth values are available) or the highest point in the vertical dimension, the overlay may be initialized to a starting position in an iteration, such that the overlay returns to the foreground to start another cycle. It should be understood that, in this manner, the overlay repeatedly transitions from the foreground to the background, and then jumps back to the foreground. In an alternative embodiment, the position of the overlay is successively decremented along the vertical dimension in a plurality of cycles, such that the overlay appears in the output image data to gradually advance from the background of the output image data to the foreground of the output image data. In this case, the position of the overlay may be initialized to the position of the horizon in each cycle or to the highest point in the vertical dimension. It should be understood that, in this manner, the overlay repeatedly transitions from the background to the foreground, and then jumps back to the background. In yet another alternative embodiment, the position of the overlay may be incremented along the vertical dimension and then decremented along the vertical dimension in an alternating manner, such that the overlay gradually transitions from the foreground to the background transitions and then gradually transitions from the background to the foreground in each of a plurality of cycles. It should be understood that, in these embodiments, the overlay may be generally oriented horizontally, such that the longitudinal axis of the overlay is horizontal (from the left side of each image frame to the right side of each image frame in the output image data).

In an alternative embodiment, the position of the overlay is moved along the horizontal dimension of the output image data, instead of the vertical dimension. In this case, the position of the overlay may be successively moved left to right or right to left along the horizontal dimension in a plurality of cycles, such that the overlay appears in the output image data to successively slide across the image. In this embodiment, the overlay may be generally oriented vertically, such that the longitudinal axis of the overlay is vertical (from the top of each image frame to the bottom of each image frame in the output image data). In each of a plurality of cycles, the position of the overlay may gradually transition or slide from the left side to the right side and then jump back to the left side of the image data, gradually transition or slide from the right side to the left side and then jump back to the right side, or gradually transition or slide from the right side to the left side and then gradually transition from the right side back to the left side.

In an embodiment, the position of the overlay may be updated at a lower rate than the frame rate of process 300A, such that the position of the overlay may remain the same over successive iterations of subprocess 340. In this embodiment, the determination in subprocess 340, within an iteration in which the position of the overlay remains the same, will be to maintain the position from the immediately preceding iteration. This overlay rate may be a user setting (e.g., which may be specified or adjusted by the remote operator), or a system setting (e.g., which may be fixed, or which may be adjusted by an administrator).

In an embodiment, the position of the overlay may change (i.e., be updated in subprocess 340) only when machine 110 is stationary or near stationary (e.g., the speed of machine 110 is below a predetermined threshold). When the machine 110 is moving, the position of the overlay may remain fixed, such that it always represents the same depth range. Alternatively, the position of the overlay may be updated additionally or only in one or more other machine states, or may always be updated, regardless of the particular machine state.

In subprocess 350, the overlay is generated on the image frame, captured by camera 156, at the determined position, to produce an augmented image frame. As mentioned above, each position may be associated with a depth range or a plurality of depth ranges. It should be understood that a depth range is a range of depth values, along the Z axis, from a first depth value to a second depth value that is higher than the first depth value. The overlay may comprise a semi-transparent mask that comprises, for each depth range, a semi-transparent band that covers at least a subset of the pixels having a depth value within that depth range. Each semi-transparent band, when overlaid on the image frame, may lighten, darken, shade, color, or otherwise highlight or distinguish all of the pixels in the image frame that are encompassed by the semi-transparent band. In an embodiment in which the overlay has a horizontal longitudinal axis, each semi-transparent band may cover the entire corresponding depth range along the Z axis (as projected onto the two-dimensional image frame), visible within the image frame, and one or more portions of the depth range along the X axis, visible within the image frame. In an alternative embodiment in which the overlay has a vertical longitudinal axis, each semi-transparent band may cover the entire depth along the Z axis (e.g., from the front of machine 110 to the horizon) and have a width covering a portion of the X axis. In either case, the border of each semi-transparent band in the overlay may be darkened, lightened, or otherwise differentiated from the interior of the semi-transparent band to clearly distinguish the outline of the semi-transparent band.

In an embodiment in which each overlay represents a plurality of depth ranges, the semi-transparent mask may comprise a separate semi-transparent band for each of the plurality of depth ranges. The plurality of depth ranges may consist of depth ranges that are separated by intervening and unmasked depth ranges. In this case, the separate semi-transparent bands of the semi-transparent mask will be spaced apart along the Z axis (as projected onto the two-dimensional image frame). It should be understood that, within the two-dimensional image frame, these semi-transparent bands will be spaced apart along the Y axis (e.g., vertical axis) of the two-dimensional image frame. In the alternative embodiment in which the overlay has a vertical longitudinal axis, each of the separate semi-transparent bands may extend along the entire Z axis (as projected onto the two-dimensional image frame), and be spaced apart along the X axis. In either case, each semi-transparent band may have the same, similar, or different characteristics (e.g., shading or color, transparency level, etc.) than other semi-transparent bands within the same overlay, in terms of how it distinguishes the underlying pixels in the image frame. The characteristics of the semi-transparent bands within the overlay may be based on settings (e.g., user or system settings) and/or other factors (e.g., type of machine 110, confidence in the calculated depth and/or height values, etc.)

One or more image processing techniques may be applied to the overlay to remove remaining noise in the 3D data and/or improve the appearance of the overlay. For example, narrow bands within the semi-transparent mask may be removed using erosion and/or dilation morphological transformations, individual contiguous bands may be identified, the edges of each band may be contoured to form a smooth outline that follows the terrain height, bands with small areas (e.g., below a threshold) may be discarded, and/or the like, to produce a visually cohesive overlay.

In an embodiment in which each pixel is associated with a height, as well as a depth, the overlay may be colorized according to the height of pixels within each depth range included in the overlay. In other words, pixels within the semi-transparent mask may be differentiated according to their height by different colors. As an example, pixels associated with a height at the lower end of possible heights (i.e., nearer to the ground plane) may be color coded with a "cool" color at one end of the color spectrum, such as green, blue, or gray, whereas pixels associated with a height at the higher end of possible heights (i.e., farther from ground plane) may be color coded with a "hot" color at the opposite end of the color spectrum, such as orange or red. The colors may gradually transition across the color spectrum from one end to the other end according to the height of the pixels, such that the topology of the terrain covered by the overlay can be discerned from the gradations in color.

In subprocess 360, the augmented image frame is output to the output image data. For example, the augmented image frame is added to the output video stream, which may be communicated to remote terminal 190 (e.g., via platform 180) and/or the display console in cabin 122. It should be understood that these augmented image frames are displayed in place of the raw image frames captured by camera 156. The resulting augmented video may be provided to an operator (e.g., a remote operator via display 192 or a local operator via the display console in cabin 122), in real time, so that the operator may easily visualize the topology of the terrain in front of camera 156.

Figure 3B:
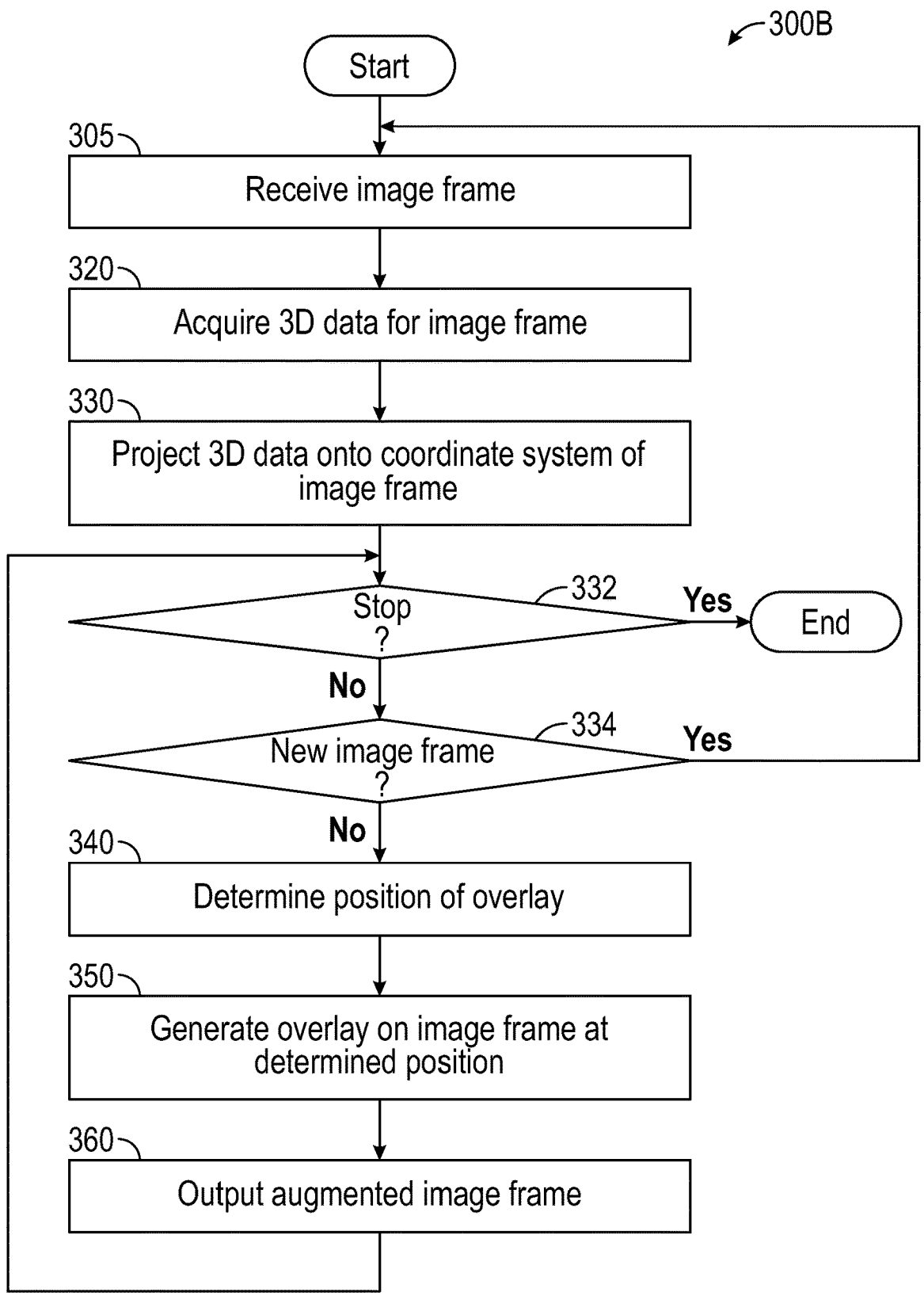

FIG. 3B illustrates a process 300B for enhancing terrain perception using a dynamic visual overlay, according to an alternative embodiment. While process 300B is illustrated with a certain arrangement and ordering of subprocesses, process 300B may be implemented with fewer, more, or different subprocesses and a different arrangement and/or ordering of subprocesses. It should be understood that any subprocess, which does not depend on the completion of another subprocess, may be executed before, after, or in parallel with that other independent subprocess, even if the subprocesses are described or illustrated in a particular order.

It is contemplated that process 300B is executed on machine 110. In particular, process 300B may be executed by ECU 150 or another processing device on machine 110. While process 300B could be executed remotely on an external system, such as platform 180 or remote terminal 190, the additional data required (e.g., two stereoscopic image frames, instead of a single augmented image frame, for each image frame) may increase traffic on network 170 and introduce delays, caused by network latencies, into process 300B. In an alternative embodiment, a portion of process 300B could be executed on machine 110, while another portion of process 300B is executed on an external system. However, it should be understood that process 300B is a relatively computationally inexpensive process that should be capable of being entirely executed on machine 110.

Process 300B may be initiated as soon as machine 110 is started, as soon as operation begins, in response to an input by the operator, in response to machine 110 becoming stationary or near stationary (e.g., the speed of machine 110 becoming less than a predetermined threshold), or in response to any other triggering event. In general, process 300B will execute to iteratively augment a single image frame in image data captured by camera 156. The augmented image data may be transmitted via communication module 154 to remote platform 180 and/or remote terminal 190. Alternatively or additionally, the augmented image data may be displayed on a display console within cabin 122 of machine 110.

In subprocess 305, an image frame of input image data (e.g., an input video stream, a still image, etc.) captured by camera 156 of machine 110. Whereas process 300A operates iteratively on a plurality of image frames to animate an overlay across image frames, process 300B operates iteratively on a single image frame to animate an overlay within a single image frame. For example, process 300B could be used when machine 110 is completely stationary. In this case, the terrain information within image data will typically not change from frame to frame, and therefore, a continuous stream of image frames do not need to be augmented. However, the image frame that is used may be updated periodically (e.g., every few seconds) to prevent unsafe conditions in which the image frame does not reflect the reality of objects moving within the field of view of camera 156. Nevertheless, traffic on network(s) 170 can be reduced by only periodically transmitting image frames (e.g., to remote terminal 190).

Subprocesses 320 and 330 are the same or similar in process 300B as in process 300A. Any description of subprocesses 320 and 330, with respect to process 300A, applies equally to subprocesses 320 and 330, respectively, in process 300B, and therefore, will not be redundantly described herein.

In subprocess 332, it is determined whether or not a stopping condition is satisfied. The stopping condition may comprise one or more stopping criteria. Generally, process 300B may execute for as long as image data is being captured by camera(s) 156, until machine 110 is turned off, until remote operation ends, in response to an input by a remote or local operator (e.g., ending augmentation), in response to machine 110 moving or the speed of machine 110 exceeding a predetermined threshold, or in response to any other triggering event. If the stopping condition is satisfied (i.e., "Yes" in subprocess 332), process 300B may end. Otherwise, if the stopping condition is not satisfied (i.e., "No" in subprocess 332), process 300B proceeds to subprocess 334.

In subprocess 334, it is determined whether or not to acquire a new image frame. For example, process 300B may determine to acquire a new image frame at predetermined intervals, at a predetermined frame rate, in response to a triggering event, and/or the like. When determining to acquire a new image frame (i.e., "Yes" in subprocess 334), process 300B returns to subprocess 305 to receive a new image frame. Otherwise, when determining not to acquire a new image frame (i.e., "No" in subprocess 334), process 300B executes an iteration of subprocesses 340-360 to augment the current image frame.

Subprocesses 340, 350, and 360 are the same or similar in process 300B as in process 300A. Any description of subprocesses 340, 350, and 360, with respect to process 300A, applies equally to subprocesses 340, 350, and 360, respectively, in process 300B, and therefore, will not be redundantly described herein. Once an augmented image frame is output, process 300B returns to subprocess 332 to determine whether or not the stopping condition is satisfied.

Figure 4C:
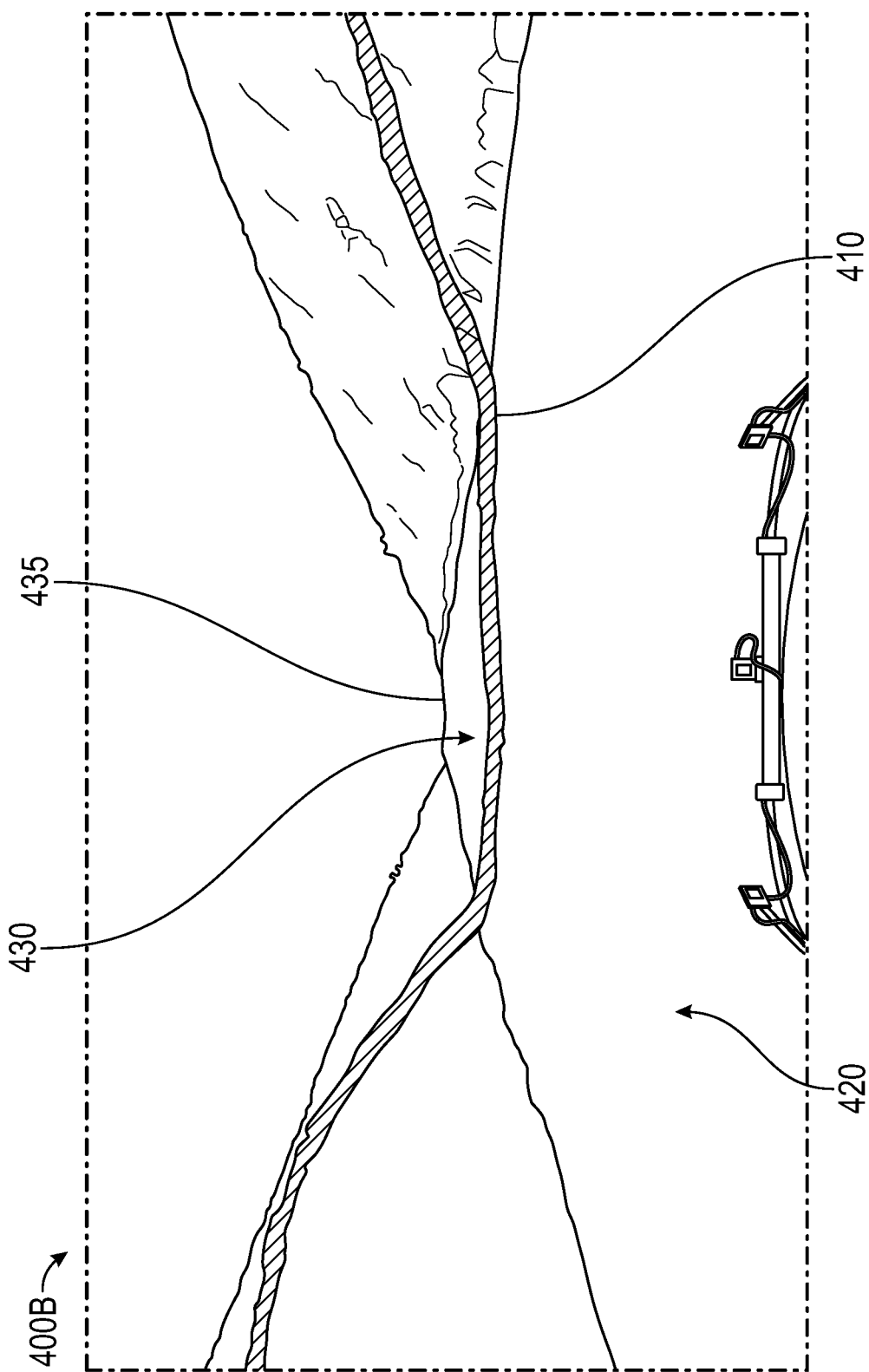

FIGS. 4A-4C illustrate an example of the overlay in augmented image data, according to an embodiment. In particular, FIG. 4A illustrates a first image frame 400A in the output image data, FIG. 4B illustrates a second image frame 400B in the output image data that is subsequent to the first image frame, and FIG. 4C illustrates a third image frame 400C in the output image data that is subsequent to the first and second image frames. The image frames 400A-400C may be collectively referred to herein as image frame 400. It should be understood that the first, second, and third image frames are not necessarily consecutive image frames in the output image data, and may be based on different image frames or the same image frame in the input image data. The image frames 400 are selected to illustrate the movement of an overlay 410 over iterations of subprocesses 340-360 in process 300A or 300B (e.g., by virtue of updates to the position of overlay 410 in subprocess 340).

As illustrated, the first image frame 400A is augmented with an overlay 410 positioned within the foreground 420 of first image frame 400A. Overlay 410 comprises a semi-transparent mask that extends the entire width of each image frame 400. The second image frame 400B, which is subsequent in time, within the output image data, to first image frame 400A, is augmented with the overlay 410 at a position that is closer to the background 430 and horizon 435 of second image frame 400B than the position of overlay 410 in first image 400A. Similarly, the third image frame 400C, which is subsequent in time to first image frame 400A and second image frame 400B, is augmented with the overlay 410 at a position that is closer to the background 430 and horizon 435 of third image frame 400C than the position of overlay 410 in first image frame 400A and second image frame 400B. In other words, over a cycle, overlay 410 recedes from foreground 420 into background 430 and towards horizon 435. When overlay 410 reaches horizon 435 or the end of the vertical dimension in the image data, the cycle may restart, such that overlay 410 is repositioned at a starting point within foreground 420 (e.g., at an initial starting depth from the front of machine 110). In other words, overlay 410 moves from foreground 420 to background 430, and then jumps back to foreground 420 when reaching horizon 435, over each of a plurality of cycles. Although not illustrated, it should be understood that overlay 410 may be colorized according to the height of each pixel in overlay 410, as described elsewhere herein.

In an alternative embodiment, overlay 410 may move in the opposite direction along the vertical dimension. This can be visualized by viewing FIGS. 4A-4C in reverse and considering second image frame 400B as subsequent in time to third image frame 400C, and first image frame 400A as subsequent in time to second image frame 400B. In other words, over a cycle, overlay 410 advances from background 430 into foreground 420 and away from horizon 435. When overlay 410 reaches the front of machine 110 or the end of the vertical dimension in the output image data, the cycle may restart, such that overlay 410 is repositioned at a starting point within background 430 (e.g., at horizon 435). In other words, overlay 410 moves from background 430 to foreground 420, and then jumps back to background 430, over each of a plurality of cycles.

Figure 5:
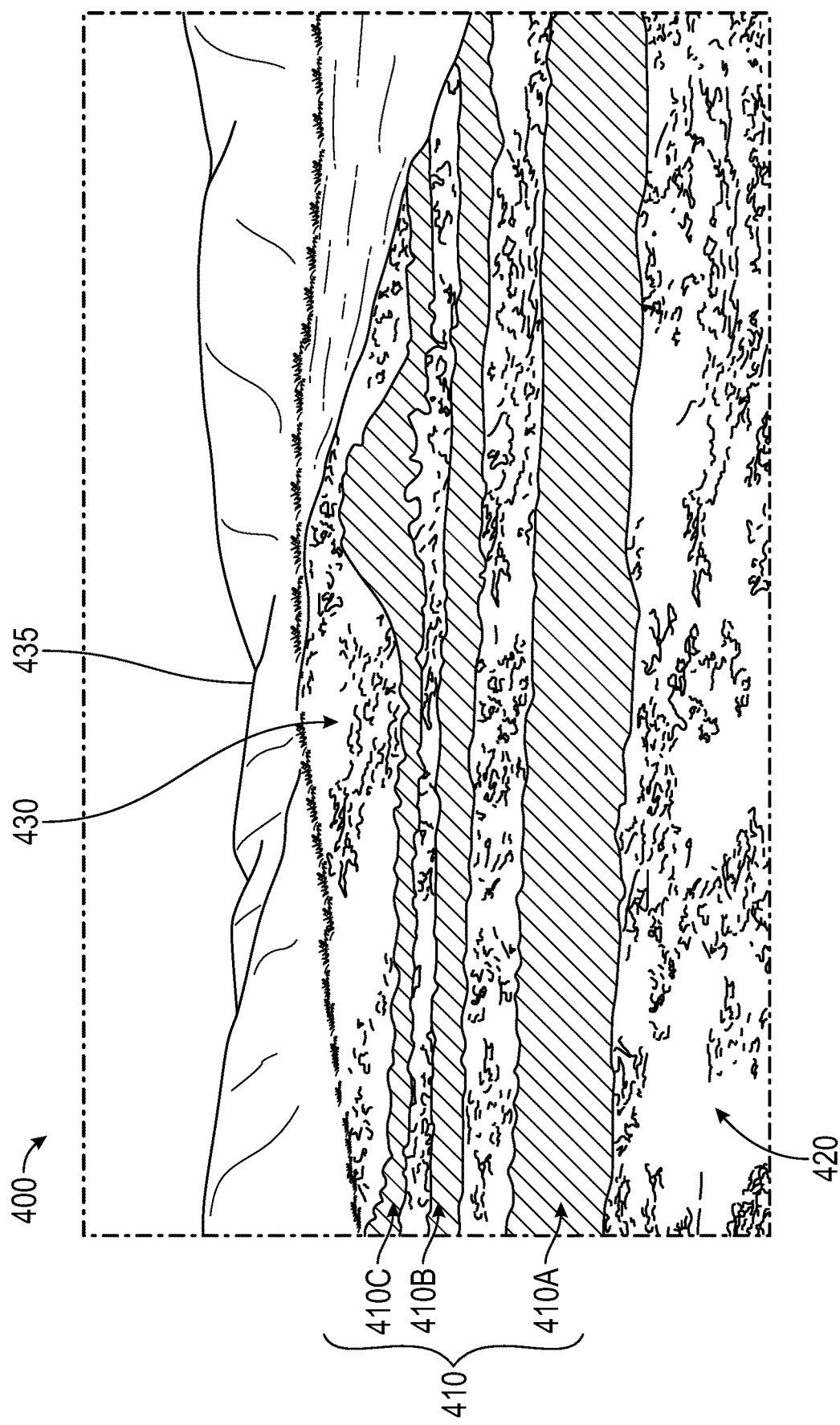
FIG. 5 illustrates an example of an overlay in an augmented image frame, according to an embodiment.

FIG. 5 illustrates an example of the overlay in an augmented image frame, according to an embodiment. In this embodiment, overlay 410 consists of a plurality of distinct semi-transparent bands 410A, 410B, and 410C, representing three different depth ranges and separated from each other by unmasked depth ranges. It should be understood that three is just an example, and that overlay 410 may consist of any number of semi-transparent bands. Notably, in this example, the longitudinal axis of overlay 410 is horizontal, and overlay 410 moves along the vertical dimension of the augmented image data. It should be understood that the entire overlay 410, including each of semi-transparent bands 410A, 410B, and 410C, may transition in concert, from foreground 420 to background 430, while maintaining their fixed separations, and jump back to foreground 420 when horizon 435 is reached, over each of a plurality of cycles. In an alternative embodiment, each of semi-transparent bands 410A, 410B, and 410C, may transition in concert, from background 430 to foreground 420, while maintaining their fixed separations, and jump back to background 430 when a final position within foreground 420 (e.g., the front of machine 110) is reached, over each of a plurality of cycles. In yet another alternative embodiment, each of semi-transparent bands 410A, 410B, and 410C, may transition in concert from foreground 420 to background 430, and then transition from background 430 to foreground 420, over each of a plurality of cycles.

In an alternative embodiment, overlay 410 may consist of a plurality (e.g., two, three, four, etc.) of distinct semi-transparent bands whose longitudinal axes are all vertical, instead of horizontal. In this case, the semi-transparent bands may extend along the vertical dimension and be separated by unmasked regions along the horizontal dimension. The entire overlay 410, including each of the vertically oriented semi-transparent bands, may transition in concert, along the horizontal dimension. For example, each semi-transparent band may, over each of a plurality of cycles, transition in concert from the left side to the right side of the image data and then jump back to the left side of the image data when the right side of the image data is reached, transition in concert from the right side to the left side of the image data and then jump back to the right side of the image data when the left side of the image data is reached, or transition in concert from the left side to the right side of the image data and then transition from the right side to the left side of the image data when the right side of the image data is reached. During each transition, the semi-transparent bands may maintain their fixed separations.

Figure 6A:
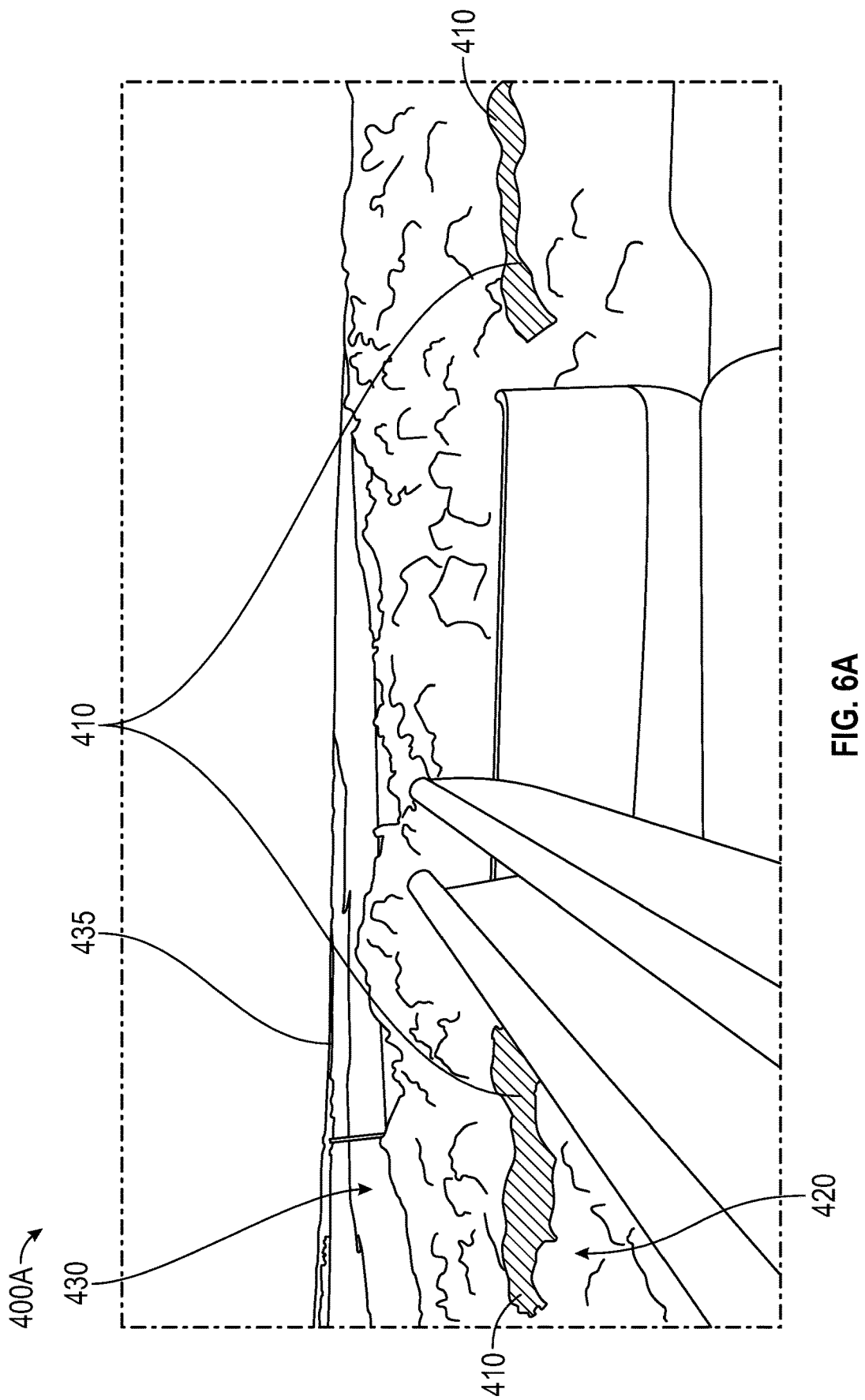
FIGS. 6A and 6B illustrate an example of an overlay in augmented image data, according to an embodiment.
Figure 6B:
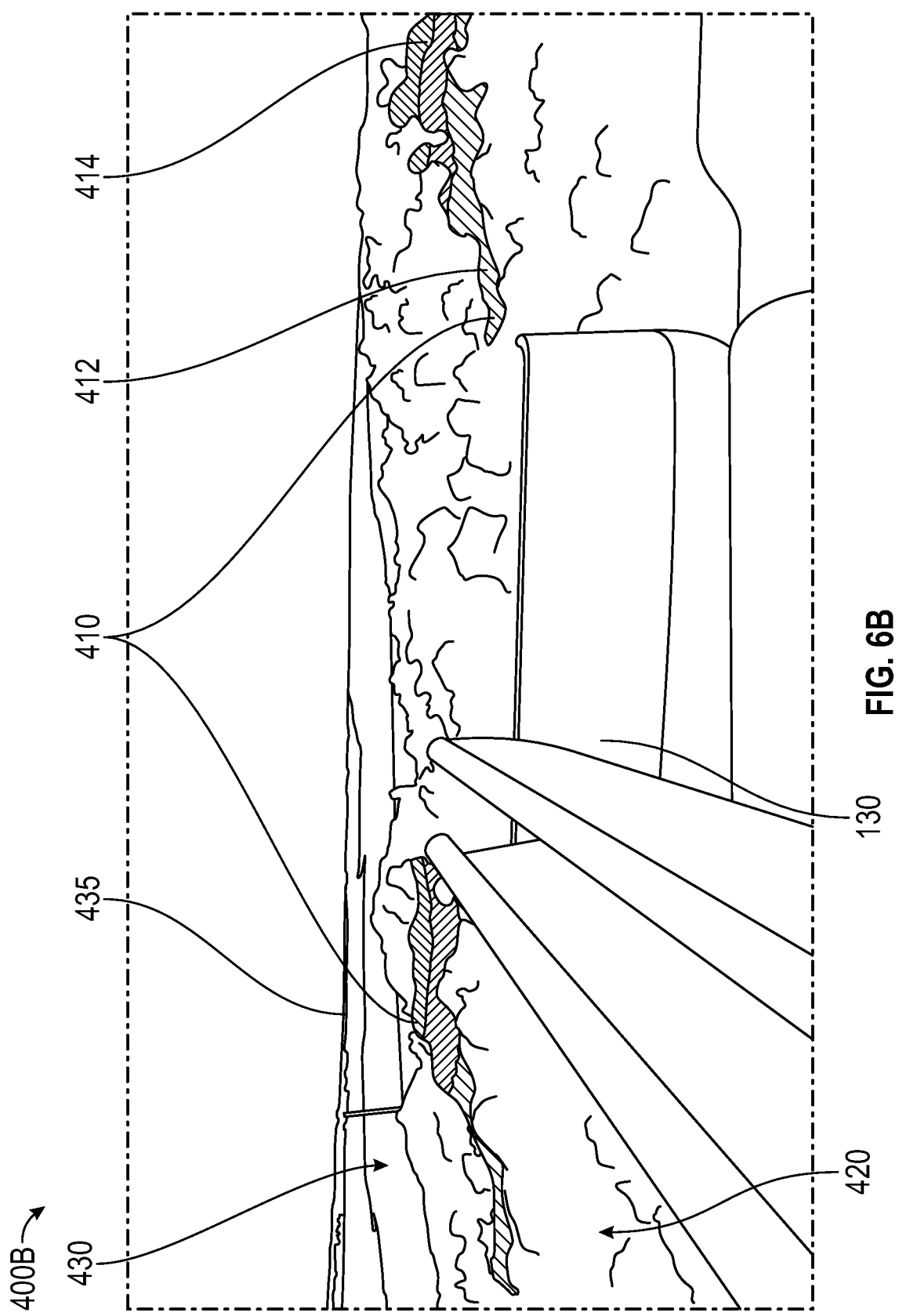

FIGS. 6A and 6B illustrate an example of a colorized overlay in augmented image data, according to an embodiment. In particular, FIG. 6A illustrates a first image frame 400A in the output image data with overlay 410 in foreground 420, and FIG. 6B illustrates a second image frame 400B in the output image data that is subsequent to the first image frame, with overlay 410 in background 430, closer to horizon 435. It should be understood that the first and second frames are not necessarily consecutive image frames in the output image data, and may be based on different image frames or the same image frame in the input image data. The image frames are selected to illustrate the movement of overlay 410 over iterations of subprocesses 340-360 in process 300A or 300B (e.g., by virtue of updates to the position of overlay 410 in subprocess 340). Different colors in overlay 410 are indicated by distinct segments of overlay 410.

In an alternative embodiment, overlay 410 may move in the opposite direction along the vertical dimension. This can be visualized by viewing FIGS. 6A and 6B in reverse and considering first image frame 400A as subsequent in time to second image frame 400B. In all other respects, the operation of overlay 410 may be identical or similar.

In FIG. 6A, the entire terrain, within the depth range represented by overlay 410 is nearly the same height and is close to the ground plane of machine 110. Therefore, a single color (e.g., at the cool end of the color spectrum) is used for the entire overlay 410.

In FIG. 6B, the terrain, within the depth range represented by overlay 410, includes more variation in height, relative to the ground plane of machine 110. Thus, overlay 410 comprises multiple patches of color, each representing a different height range for the respective underlying terrain. For example, patch 412 represents a "cool" color (e.g., gray, blue, or green) on one end of the available color spectrum, indicating that the terrain in this area is relatively close to the ground plane of machine 110. In contrast, patch 414 represents a "hot" color (e.g., red) on the opposite end of the available color spectrum, indicating that the terrain in this area is relatively elevated above the ground plane of machine 110. Thus, a remote operator can easily perceive the gradations in elevation of the terrain in image frame 400 by virtue of the gradations in colors within overlay 410.

Notably, in FIGS. 6A and 6B, work implement 130 is visible within image frame 400. Thus, at some positions, some of the depth range, represented by overlay 410, may be blocked by work implement 130, and therefore, not visible within image frame 400. More generally, there may be instances in which portions of a depth range, represented by overlay 410, may be blocked by objects or terrain, such that they are not visible within image frame 400. In these cases, the semi-transparent band for a given depth range may consist of multiple bands representing only those portions of the depth range that are visible within image frame 400, as illustrated, for example in FIGS. 6A and 6B. In other words, the semi-transparent band may not be contiguous throughout image frame 400. In these cases, as discussed elsewhere herein, any bands whose areas do not satisfy one or more criteria (e.g., contain less than a predefined threshold number of pixels) may be filtered out (i.e., excluded from overlay 410), leaving overlay 410 to consist of only those band(s) whose areas satisfy the one or more criteria (e.g., contain greater than a predefined threshold number of pixels). The removal of small bands can improve the operator's ability to quickly understand the terrain information in overlay 410, by drawing the operator's focus to bands with high amounts of relevant information, while not being distracted by bands with little relevant information.

Figure 7A:
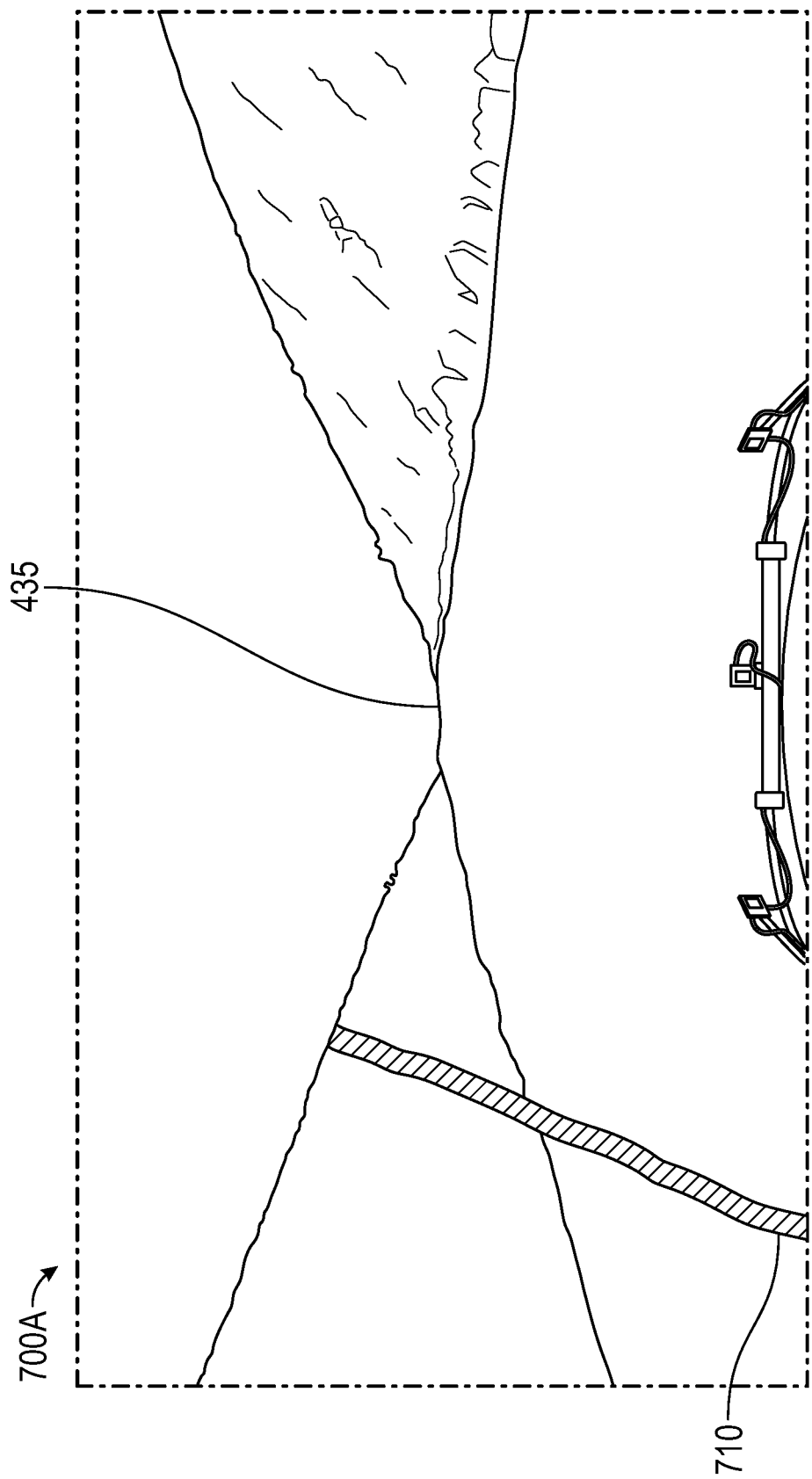
Figure 7C:
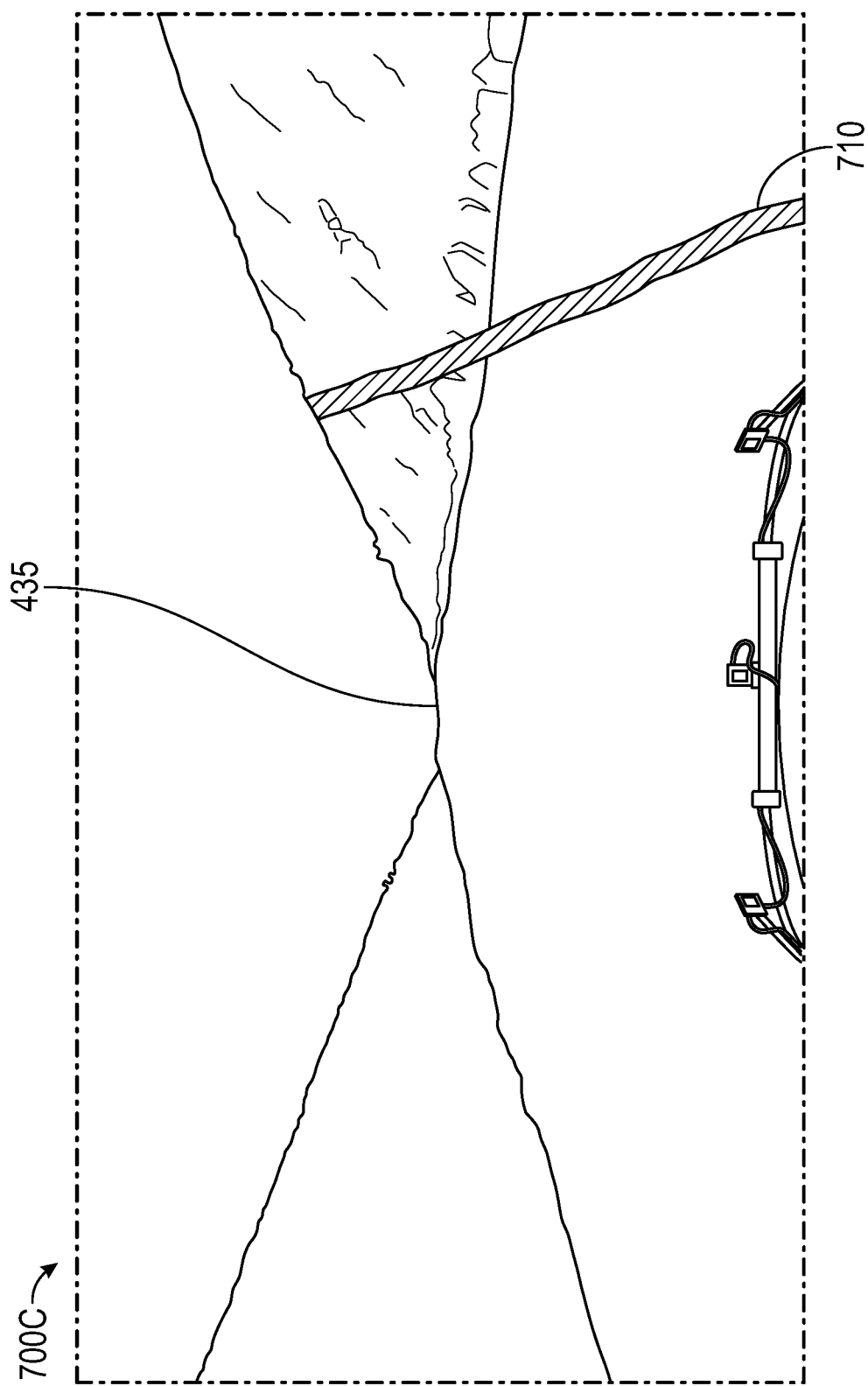

FIGS. 7A-7C illustrate an example of an overlay in augmented image data, according to an embodiment. In particular, FIG. 7A illustrates a first image frame 700A in the output image data, FIG. 7B illustrates a second image frame 700B in the output image data that is subsequent to the first image frame, and FIG. 7C illustrates a third image frame 700C in the output image data that is subsequent to the first and second image frames. The image frames 700A-700C may be collectively referred to herein as image frame 700. It should be understood that the first, second, and third image frames are not necessarily consecutive image frames in the output image data, and may be based on different image frames or the same image frame in the input image data. The image frames 700 are selected to illustrate the movement of an overlay 710 over iterations of subprocesses 340-360 in process 300A or 300B (e.g., by virtue of updates to the position of overlay 710 in subprocess 340).

Overlay 710 is similar to overlay 410, but is oriented substantially vertically, instead of horizontally. As illustrated, the first image frame 700A is augmented with an overlay 710 positioned near the left side of the image frame. Overlay 710 comprises a semi-transparent mask that extends the entire terrain from the front of machine 110 to horizon 435. The second image frame 700B, which is subsequent in time, within the output image data, to first image frame 700A, is augmented with the overlay 710 at a position that is closer to the center of second image frame 700B than the position of overlay 710 in first image 700A. Similarly, the third image frame 700C, which is subsequent in time to first image frame 700A and second image frame 700B, is augmented with the overlay 710 at a position that is near the right side of the image frame. In other words, over a cycle, overlay 710 slides from the left side of the output image data to the right side of the output image data. When overlay 710 reaches the right side of the horizontal dimension in the output image data, the cycle may restart, such that overlay 710 is repositioned at a starting point at or near the left side of the output image data. In other words, overlay 710 moves from the left side to the right side, and then jumps back to the left side, over each of a plurality of cycles. Although not illustrated, it should be understood that overlay 710 may be colorized according to the height of each pixel in overlay 710, as described elsewhere herein.

In an alternative embodiment, overlay 710 may move in the opposite direction along the horizontal dimension. This can be visualized by viewing FIGS. 7A-7C in reverse and considering second image frame 700B as subsequent in time to third image frame 700C, and first image frame 700A as subsequent in time to second image frame 700B. In other words, over a cycle, overlay 710 slides from the right side to the left slide, and then jumps back to the right side. In yet another alternative embodiment, in each cycle, overlay 710 may move from a first side of the output image data to the opposite and second side of the output image data (e.g., from left to right or from right to left), and then move from the second side of the output image data back to the first side of the output image data (e.g., from right to left or from left to right). In other words, overlay 710 slides back and forth horizontally across the image frame(s) in the output image data.

Although overlays 410 and 710 are described as being generally oriented horizontally and vertically, respectively, it should be understood that these overlays do not need to be, and generally will not be, perfectly horizontal or vertical. Rather, the actual shape of the overlays may be dictated by the calculated depth values and/or height values, filtering (e.g., removal of small bands), and/or by the perspective. For example, as illustrated in FIGS. 4A-5, the semi-transparent bands in the overlays may curve, widen, narrow, and/or the like with the terrain. In addition, as illustrated in FIGS. 6A and 6B, a semi-transparent band in the overlay may be non-contiguous and comprise a plurality of separate bands. Furthermore, as illustrated in FIGS. 7A and 7C, a vertical semi-transparent band may follow the perspective in the image frame. Alternatively, the vertical semi-transparent band could be vertically oriented without accounting for perspective in the image frame.

Figure 8:
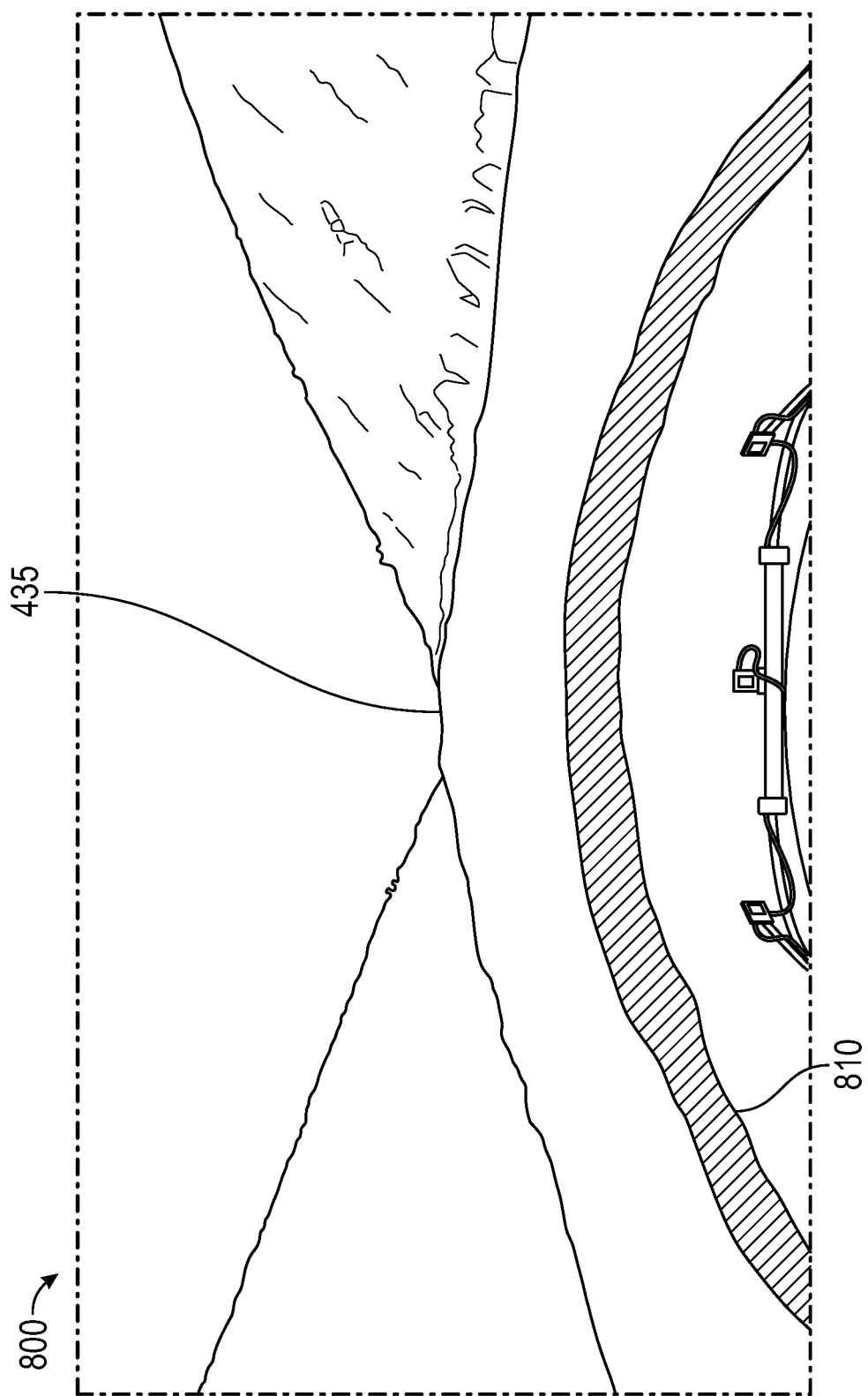
FIG. 8 illustrates an example of an overlay in an augmented image frame, according to an embodiment.

FIG. 8 illustrates an example of the overlay in an augmented image frame, according to an embodiment. In this embodiment, overlay 810 comprises a semi-transparent radial band. While only a single such radial band is illustrated, overlay 810 could alternatively comprise a plurality (e.g., two, three, four, etc.) of semi-transparent radial bands. In this case, the plurality of semi-transparent radial bands may be radially separated by a fixed depth or distance. Each semi-transparent radial band may encompass pixels that are within a radial range (i.e., between two radial distances) from a reference point at the front of machine 110. Overlay 810 may move radially outwards from the reference point at the front of machine 110 (i.e., by virtue of position updates in subprocess 340 of process 300A or 300B), such that the semi-transparent radial band(s) appear to emanate outwards in a polar fashion, like a traditional SONAR wave. It should be understood that, as overlay 810 emanates outwardly, the length of the semi-transparent radial band(s) may increase, as the radius from the reference point increases. Once the position of overlay 810 reaches horizon 435, the position of overlay 810 may jump back to the reference point to once again emanate outwardly in a new cycle. Alternatively, the position of overlay 810 my advance inwardly from horizon 435 to the reference point and then jump back to horizon 435 in each cycle, or may emanate outwardly from the reference point to horizon 435 and then advance inwardly from horizon 435 to the reference point in each cycle. Overlay 810 may comprise any of the features described herein with respect to other examples of the overlay, including colorization based on the height or elevation associated with pixels encompassed by overlay 810.

INDUSTRIAL APPLICABILITY

Disclosed embodiments augment image data captured by a camera 156 mounted on a machine 110 to convey information about the terrain in the camera's field of view. This terrain information may comprise the depth and height of the terrain in an easy-to-understand visual overlay 410. Overlay 410 may be a semi-transparent mask comprising one or more semi-transparent bands that conform to the terrain's depth at a given depth range from machine 110. The semi-transparent bands may also be colorized according to the terrain's height, relative to the ground plane, within the given depth range from machine 110. Overlay 410 may dynamically move from foreground 420 to background 430 towards the horizon 435, similarly to a wave passing over the terrain or in a sound navigation and ranging (SONAR) system, dynamically move from background 430 to foreground 420 away from the horizon 435, dynamically move back and forth between foreground 420 and background 430, dynamically move from left to right, dynamically move right to left, or dynamically move back and forth from left to right. In an embodiment, the motion of overlay 410 does not depend upon the motion of machine 110. Thus, overlay 410 may convey terrain information even when machine 110 is stationary.

In an embodiment, the augmented image data are provided to a remote operator at a remote terminal 190, for example, as an augmented video stream on display 192. This enables the remote operator to understand the terrain around (e.g., in front of) machine 110, despite not being present in cabin 122. Alternatively or additionally, the augmented image data is provided to a local operator within cabin 122, for example, as an augmented video stream on a display console within cabin 122. Even though the local operator can see the terrain through the window(s) of cabin 122, the augmented image data may still be useful in circumstances in which visibility is diminished, especially if 3D sensor 358 comprises a ranging device (e.g., RADAR, LIDAR, etc.). Such circumstances include, without limitation, low-light conditions, conditions in which dark shadows obscure the terrain, environmental conditions (e.g., rain, dust, or fog), and/or the like.

It will be understood that the benefits and advantages described above may relate to one embodiment or may relate to several embodiments. Aspects described in connection with one embodiment are intended to be able to be used with the other embodiments. Any explanation in connection with one embodiment applies to similar features of the other embodiments, and elements of multiple embodiments can be combined to form other embodiments. The embodiments are not limited to those that solve any or all of the stated problems or those that have any or all of the stated benefits and advantages.

The preceding detailed description is merely exemplary in nature and is not intended to limit the invention or the application and uses of the invention. The described embodiments are not limited to usage in conjunction with a particular type of machine. Hence, although the present embodiments are, for convenience of explanation, depicted and described as being implemented in a particular type of mobile equipment, it will be appreciated that it can be implemented in various other types of mobile equipment and other types of machines which may otherwise benefit from terrain information within a field of view, and in various other systems and environments. Furthermore, there is no intention to be bound by any theory presented in any preceding section. It is also understood that the illustrations may include exaggerated dimensions and graphical representation to better illustrate the referenced items shown, and are not considered limiting unless expressly stated as such.

What is claimed is:

1. A method of augmenting image data during operation of a machine, the method comprising using at least one hardware processor to:
for each of one or more image frames in input image data captured by a camera mounted on the machine,
acquire three-dimensional (3D) data for the image frame based on an output of a 3D sensor mounted on the machine, wherein the 3D data comprise a depth value for each of a plurality of points;
project the 3D data onto a coordinate system of the image frame, wherein projecting the 3D data onto the coordinate system of the image frame comprises mapping at least a subset of pixels in the image frame to the depth values for the plurality of points;
determine a position of an overlay within the image frame;
generate the overlay at the determined position within the image frame to produce an augmented image frame, wherein the overlay comprises at least one semi-transparent band overlaid on pixels whose depth values are within a depth range defined by the determined position; and
output the augmented image frame to output image data,
wherein the position of the overlay within the augmented one or more image frames is moved along a dimension of the output image data in each of a plurality of cycles.

2. The method of claim 1, wherein the position of the overlay within the augmented one or more image frames is moved along a vertical dimension of the output image data in each of the plurality of cycles.

3. The method of claim 2, wherein the position of the overlay is incremented from a foreground of the output image data to a background of the output image data.

4. The method of claim 2, wherein the position of the overlay is decremented from a background of the output image data to a foreground of the output image data.

5. The method of claim 1, wherein the position of the overlay within the augmented one or more image frames is moved along a horizontal dimension of the output image data in each of the plurality of cycles.

6. The method of claim 1, wherein the input image data comprise an input video stream and the one or more image frames are a plurality of image frames in the input video stream, wherein the output image data comprise an output video stream and the augmented one or more image frames are a plurality of image frames in the output video stream, and wherein the position of the overlay is moved along the dimension across the plurality of image frames of the output video stream in each of the plurality of cycles.

7. The method of claim 1, wherein the 3D sensor comprises a stereo camera, and wherein acquiring the 3D data comprises calculating a depth of each pixel in a stereoscopic image frame captured by the stereo camera, and wherein the 3D data comprise the calculated depths.

8. The method of claim 7, wherein acquiring the 3D data further comprises calculating a height of each pixel in the stereoscopic image frame, relative to a ground plane of the machine, and wherein the 3D data further comprise the calculated heights.

9. The method of claim 1, wherein the overlay comprises a plurality of semi-transparent bands representing different depth ranges, and wherein each of the plurality of semi-transparent bands is separated from an adjacent one of the plurality of semi-transparent bands by a depth range.

10. The method of claim 1, wherein the 3D data further comprise a height value for each of the plurality of points relative to a ground plane of the machine, wherein projecting the 3D data onto the coordinate system of the image frame comprises mapping the at least a subset of pixels to the height values for the plurality of points, and wherein the overlay indicates a height at each pixel on which the at least one semi-transparent band is overlaid.

11. The method of claim 10, wherein the overlay indicates the height at each pixel by colorizing each pixel according to a color spectrum, wherein greater heights are indicated by colors that are closer to one end of the color spectrum and lower heights are indicated by colors that are closer to an opposite end of the color spectrum.

12. The method of claim 1, wherein each of the plurality of cycles starts with the overlay at an initial position in a foreground of the image data and ends with the overlay in a background of the image data, and wherein, at the end of each of the plurality of cycles, the position of the overlay is reset to the initial position.

13. The method of claim 1, wherein the at least one hardware processor is comprised in an electronic control unit (ECU) of the machine.

14. The method of claim 1, further comprising using the at least one hardware processor to:
transmit the augmented video stream over a wireless network to at least one external system;
receive control commands over the wireless network from the at least one external system; and
control one or more subsystems of the machine according to the received control commands.

15. A machine comprising:
a camera configured to capture a field of view in front of the machine;
a three-dimensional (3D) sensor;
at least one hardware processor; and
software configured to, when executed by the at least one hardware processor, for each of one or more image frames in input image data captured by the camera,
acquire 3D data for the image frame based on an output of the 3D sensor including a depth value for each of a plurality of points,
project the 3D data onto a coordinate system of the image frame comprising mapping at least a subset of points in the image frame to the depth values for the plurality of points,
determine a position of a visual overlay on points within the image frame, whose depth values are within a depth range defined by the determined position,
generate the visual overlay at the determined position within the image frame to produce an augmented image frame, and
output the augmented image frame to output image data,
wherein the position of the visual overlay within the augmented one or more image frames is moved along a dimension of the output image data in each of a plurality of cycles.

16. The machine of claim 15, wherein the position of the overlay within the augmented one or more image frames is moved along a vertical dimension of the output image data in each of the plurality of cycles.

17. The machine of claim 15, wherein the position of the overlay within the augmented one or more image frames is moved along a horizontal dimension of the output image data in each of the plurality of cycles.

18. A non-transitory computer-readable medium having instructions stored thereon, wherein the instructions, when executed by a processor, cause the processor to:
for each of one or more image frames in input image data captured by a camera mounted on the machine,
acquire three-dimensional (3D) data for the image frame based on an output of a 3D sensor mounted on the machine;
project the 3D data onto a coordinate system of the image frame;
determine a position of an overlay within the image frame;
generate the overlay at the determined position within the image frame to produce an augmented image frame; and
output the augmented image frame to output image data,
wherein the position of the overlay within the augmented one or more image frames is moved along a dimension of the output image data in each of a plurality of cycles, wherein each of the plurality of cycles starts with the overlay at an initial position in a foreground of the image data and ends with the overlay in a background of the image data, and wherein, at the end of each of the plurality of cycles, the position of the overlay is reset to the initial position.

* * * * *